US012228418B1

(12) United States Patent
Zorluoglu et al.

(10) Patent No.: US 12,228,418 B1
(45) Date of Patent: Feb. 18, 2025

(54) METHODS AND SYSTEMS FOR GENERATING LOCAL-AND GLOBAL-WALKABLE PATHS FOR ROUTE GUIDANCE

(71) Applicant: Pointr Limited, London (GB)

(72) Inventors: Haluk Ziya Zorluoglu, Istanbul (TR); Can Tunca, Istanbul (TR); Gurol Canbek, Ankara (TR)

(73) Assignee: Pointr Limited, London (GB)

( * ) Notice: Subject to any disclaimer, the term of this patent is extended or adjusted under 35 U.S.C. 154(b) by 0 days.

(21) Appl. No.: 18/937,361

(22) Filed: Nov. 5, 2024

Related U.S. Application Data

(63) Continuation of application No. 18/814,802, filed on Aug. 26, 2024, now Pat. No. 12,174,035, which is a continuation of application No. 18/610,662, filed on Mar. 20, 2024, now Pat. No. 12,146,759, which is a continuation of application No. 18/389,530, filed on Nov. 14, 2023, now Pat. No. 11,959,763.

(60) Provisional application No. 63/514,594, filed on Jul. 20, 2023.

(51) Int. Cl.
| | |
|---|---|
| *G06K 7/10* | (2006.01) |
| *G01C 21/36* | (2006.01) |
| *G06K 7/14* | (2006.01) |
| *G06Q 30/0601* | (2023.01) |

(52) U.S. Cl.
CPC ....... *G01C 21/3617* (2013.01); *G01C 21/362* (2013.01); *G01C 21/3623* (2013.01); *G06K 7/10297* (2013.01); *G06K 7/1413* (2013.01); *G06K 7/1417* (2013.01); *G06Q 30/0601* (2013.01)

(58) Field of Classification Search
CPC ............. G01C 21/3617; G01C 21/362; G01C 21/3623; G06K 7/10297; G06K 7/1413; G06K 7/1417; G06Q 30/0601
See application file for complete search history.

(56) References Cited

U.S. PATENT DOCUMENTS

| | | | |
|---|---|---|---|
| 10,324,197 | B1 | 6/2019 | Akpinar et al. |
| 10,378,907 | B1 | 8/2019 | Akpinar et al. |
| 10,539,424 | B2 | 1/2020 | Roy et al. |
| 10,834,528 | B2 | 11/2020 | Akpinar et al. |
| 10,883,833 | B2 | 1/2021 | Akpinar et al. |
| 11,029,415 | B2 | 6/2021 | Akpinar et al. |

(Continued)

FOREIGN PATENT DOCUMENTS

| | | |
|---|---|---|
| CN | 205680303 U | 11/2016 |
| CN | 107063236 A | 8/2017 |

(Continued)

*Primary Examiner* — Mathew Franklin Gordon
(74) *Attorney, Agent, or Firm* — Dickinson Wright PLLC; Mark E. Scott

(57) ABSTRACT

Generating local- and global-walkable paths for route guidance. At least one example is a computer-implemented method of generating comprehensive maps for route guidance, the method comprising: receiving, by a processor, a floorplan delineating walkable and non-walkable areas; performing, by the processor, spatial analysis regarding the walkable areas to find a path graph for the walkable areas, the path graph comprises a plurality of segments defined by vertices, and the plurality of segments defining local-walkable paths; and removing, by a processor, segments that intersect non-walkable areas to generate a set of global-walkable paths from the path graph.

20 Claims, 19 Drawing Sheets

(56) References Cited

U.S. PATENT DOCUMENTS

| | | |
|---|---|---|
| 11,156,465 B2 | 10/2021 | Roy et al. |
| 11,169,280 B2 | 11/2021 | Akpinar et al. |
| 11,514,633 B1 | 11/2022 | Cetintas et al. |
| 11,657,555 B1 | 5/2023 | Cetintas et al. |
| 11,725,948 B2 | 8/2023 | Roy et al. |
| 2005/0075116 A1 | 4/2005 | Laird et al. |
| 2011/0144902 A1 | 6/2011 | Forte et al. |
| 2014/0278097 A1 | 9/2014 | Khorsheed et al. |

FOREIGN PATENT DOCUMENTS

| | | |
|---|---|---|
| CN | 111288996 A | 6/2020 |
| WO | 2017030366 A1 | 2/2017 |

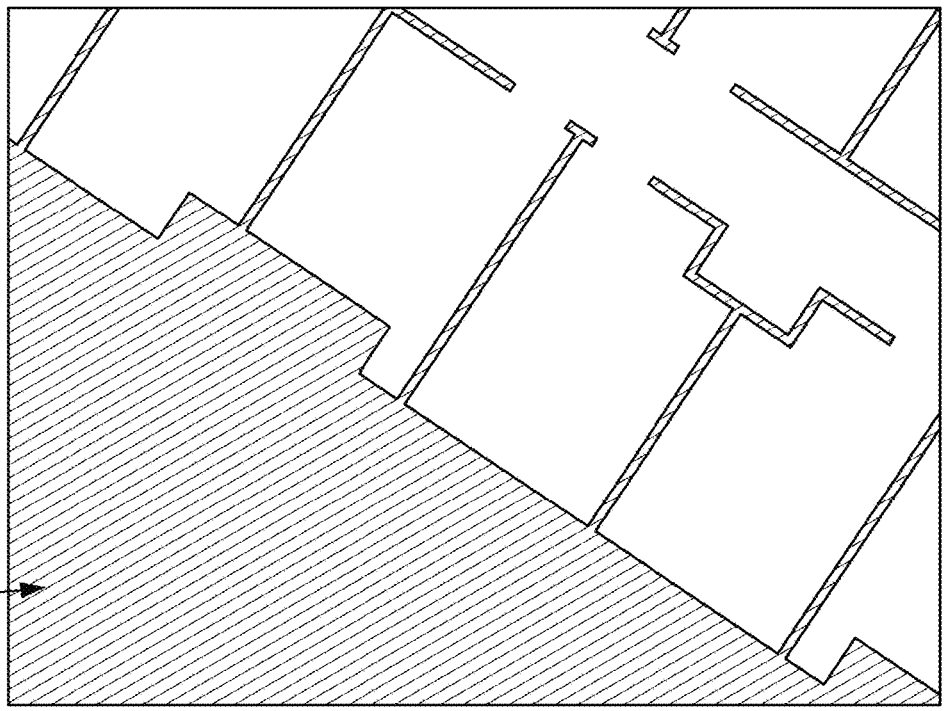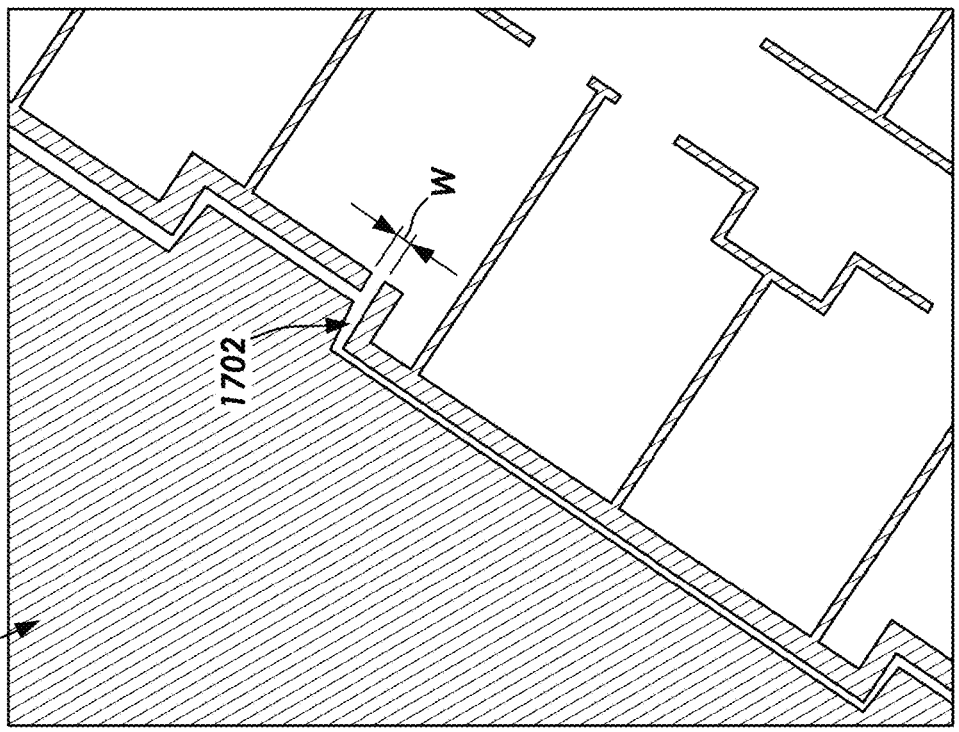
FIG. 17

METHODS AND SYSTEMS FOR GENERATING LOCAL- AND GLOBAL-WALKABLE PATHS FOR ROUTE GUIDANCE

CROSS-REFERENCE TO RELATED APPLICATIONS

This application is a continuation of U.S. application Ser. No. 18/814,802 filed Aug. 26, 2024 titled "Methods and Systems for Generating Local- and Global-Walkable Paths for Route Guidance." The '802 application is a continuation of U.S. application Ser. No. 18/610,662 filed Mar. 20, 2024 titled "Methods and Systems of Generating Route Guidance in Near Real-Time." The '662 application is a continuation of U.S. application Ser. No. 18/389,530 filed Nov. 14, 2023 titled "Methods and Systems of Generating Route Guidance in Near Real-Time." The '530 application claims the benefit of U.S. Prov. App. No. 63/514,594 filed Jul. 20, 2023 titled "System and Methods for Instant Maps and Auto-Routing Indoors and Outdoors." All the noted applications are incorporated by reference herein as if reproduced in full below.

BACKGROUND

Computer-assisted navigation, while improving vastly since its nascent stages, is still cumbersome to use in some situations. For example, it may take several minutes to find and instantiate an application that is locally-run on a mobile device, interact with the application to select the destination, receive a route from a backend server, and begin route guidance. Similar issues exist for navigation that is browser based, rather than locally run. Moreover, regardless of how executed, selecting the destination involves typing an address or destination using the small keyboard of a mobile device, which is prone to error. Any system or method of generating and providing route guidance that improves the instantiation of route guidance would provide a competitive advantage in the marketplace.

SUMMARY

One example is a method of providing route guidance by way of a mobile device, the method comprising: acquiring an applet by the mobile device, the acquiring responsive to a trigger event, and the trigger event identifies a destination location; determining, by the applet executed on the mobile device, an initial location of the mobile device; sending, by the applet executed on the mobile device, to a server an indication of the initial location of the mobile device and an indication of the destination location; receiving, by the mobile device from the server, a map comprising the initial location and the destination location; determining, by the applet executed on the mobile device, a route from the initial location to the destination location; and providing, by the applet executed on mobile device, guidance along the route to the destination location.

Another example is a computer-implemented method of implementing route guidance, the method comprising: receiving, by a processor from a mobile device, an indication of an initial location and an indication of a destination location; generating, by the processor, a path map based on a comprehensive map, the path map comprising the initial location, the destination location, and a plurality of paths representing a plurality of routes between the initial location and the destination location; and sending, by the processor, the path map to the mobile device.

Yet another example is a computer system comprising: a processor; a communications interface coupled to the processor; and a memory coupled to the processor. The memory storing instructions that, when executed by the processor, cause the processor to: receive, from a mobile device, an indication of an initial location and an indication of a destination location; generate a path map based on a comprehensive map, the path map comprising the initial location, the destination location, and a plurality of paths representing a plurality of routes between the initial location and the destination location; and send the path map to the mobile device.

Another example is computer-implemented method of generating comprehensive maps for route guidance, the method comprising: receiving, by a processor, a floorplan delineating walkable and non-walkable areas; performing, by the processor, spatial analysis regarding the walkable areas to find a path graph for the walkable areas, the path graph comprises a plurality of segments defined by vertices, and the plurality of segments defining local-walkable paths; and generating, by the processor, a set of global-walkable paths from the path graph, the generating comprising reducing a number of dead-end segments, and reducing a number of vertices.

Yet another example is a computer system comprising: a processor; a communications interface coupled to the processor; and a memory coupled to the processor. The memory storing instructions that, when executed by the processor, cause the processor to: receive a floorplan delineating walkable and non-walkable areas; perform spatial analysis regarding the walkable areas to find a path graph for the walkable areas, the path graph comprises a plurality of segments defined by vertices, and the plurality of segments defining local-walkable paths; and generate a set of global-walkable paths from the path graph, the generating comprising reducing a number of dead-end segments, and reducing a number of vertices.

BRIEF DESCRIPTION OF THE DRAWINGS

For a detailed description of example embodiments, reference will now be made to the accompanying drawings in which:

FIG. 17 shows example floorplans to describe removing walkable areas, in accordance with at least some embodiments;

DEFINITIONS

Figure 1:
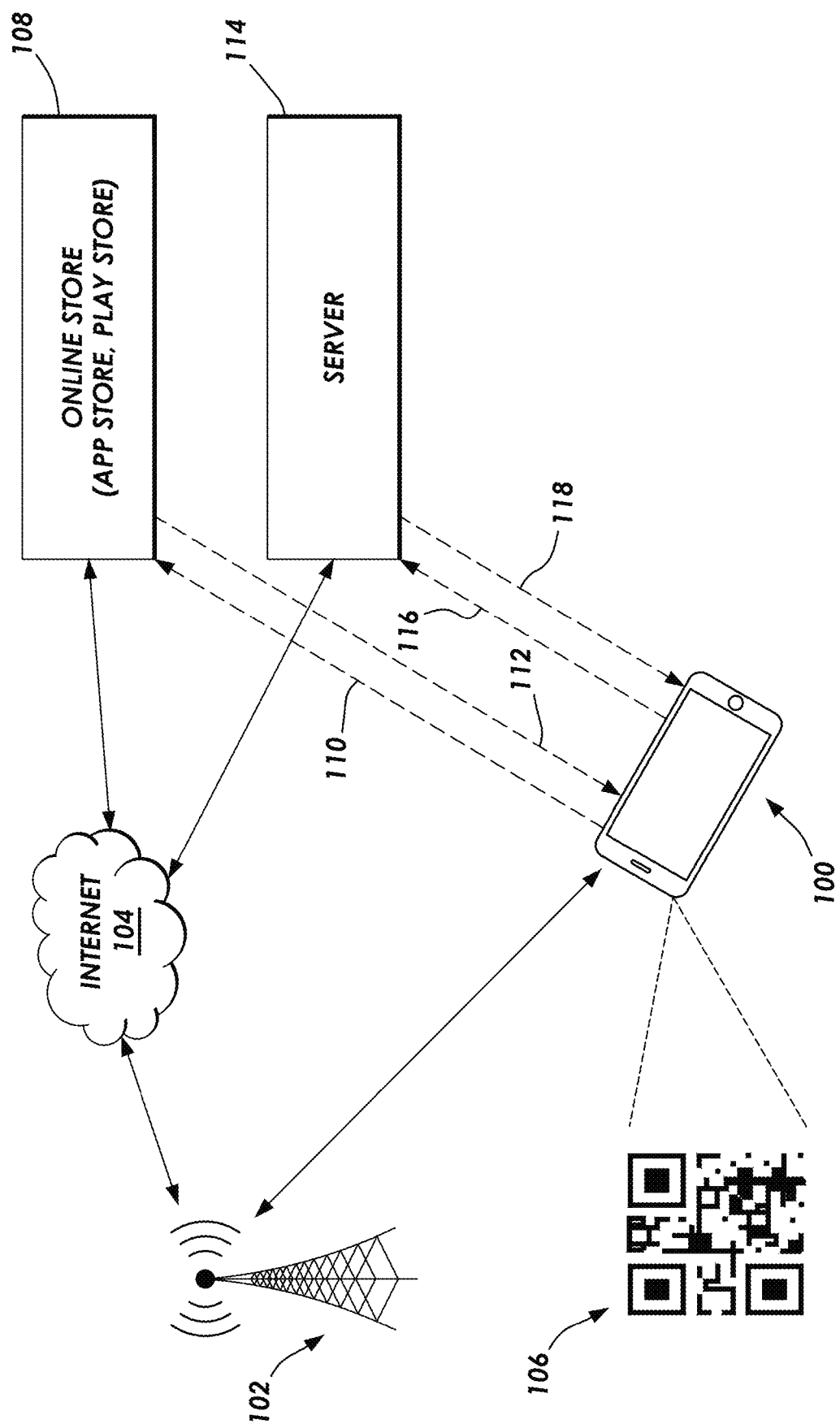
FIG. 1 shows an example system for providing route guidance, in accordance with at least some embodiments.

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection or through an indirect connection via other devices and connections.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions. For antecedent basis purposes, a later reference to "the processor" does not obviate that the referred-to processor may be one or more processors.

"Near real-time" shall mean a result is provided on a mobile device (e.g., a full or partial map displayed) in five seconds or less from a trigger event.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

SUMMARY OF USER-FACING ASPECTS

Various examples are directed to methods and systems of generating walkable route guidance in near real-time. More particularly, various examples are directed to providing walkable route guidance in near-real time responsive to a trigger event, with the route guidance provided on a mobile device (e.g., a smart phone or tablet device). In various examples, the trigger event causes the download and execution of a small program, hereafter just applet (e.g., 15 megabytes or less). The applet, in turn, sends information to a server, the information including the initial location as determined by the mobile device and the destination location indicated by the trigger event. Responsive to the communication to the server, a text-based map is provided to the applet from the server. The text-based map encompasses the initial location, the destination location, and various paths connecting the initial location and the designation location. The applet, in turn, determines and displays a route from the initial location to the destination location using the text-based map, and provides route guidance along the route. The specification turns to an example system to orient the reader.

FIG. 1 shows a diagram of an example system as a high-level overview of providing walkable route guidance in near real-time. In particular, FIG. 1 shows a mobile computing device or mobile device 100. The mobile device 100 may take any suitable form, such as a hand-held mobile device with a battery, including smart phones and tablet devices. The mobile device 100 is communicatively coupled to the Internet. The communicative coupling to the Internet may take any suitable form, such as data communication services provided by a cellular network, or by the mobile device 100 being coupled to the Internet by way of Wi-Fi network. In the example of FIG. 1, the connectivity to the Internet is illustrated by the mobile device 100 communicating to a cellular tower 102. The cellular system, of which the cellular tower 102 is member, communicatively couples the mobile device 100 to the Internet 104. Thus, the mobile device 100 is communicatively coupled to services provided on or across the Internet 104.

In example cases, a trigger event begins the process of generating and providing route guidance in near real-time. In FIG. 1, the example trigger event is the mobile device 100 reading a quick-response code, hereafter QR code 106. The trigger event being reading of the QR code 106 is a non-limiting example, and further examples are provided below. The QR code 106 may be displayed in any suitable form and at any suitable location. For example, the QR code 106 may be statically displayed, such as on a billboard, on a flyer, or on a ticket (e.g., boarding pass, ticket for a car park). In other cases, the QR code 106 may be digitally rendered and displayed, such as on a video screen or computer monitor. Regardless of how the example QR code 106 is displayed, the mobile device 100 reads the QR code 106, such as by viewing the QR code 106 by way of a camera application or any other suitable technique for reading bar codes using the mobile device 100.

The example QR code 106 embeds or contains several pieces of information. The first piece of the information is an identity of an applet. The identity of the applet may be direct, such as identifying the applet by name. In other cases, the identity of the applet may be indirect, such as the name of a website associated with an applet. The specification discusses these options in greater detail below. The second piece of information is an indication of a destination location, which may take many forms. For example, the indication of the destination location may directly indicate the destination, such as a physical address, a room number within a building, a gate number, or a set of geolocation coordinates. Stated otherwise, the indication of the destination location may identify a location that is static. In other cases, the indication of the destination location may identify a non-static or run-time determined location. For example, the indication of the destination location may identify: a closest fire escape; a closest non-blocked fire escape, which may not be the closest fire escape; a previously unassigned departure gate for an airplane; a departure gate for an airplane that has changed; a previously unassigned departure location for train; and a departure location for train that has changed.

Using the identity of the applet, the mobile device accesses an online store 108 over the Internet 104, and downloads the applet to the mobile device 100. That is to say, the mobile device 100 acquires the applet responsive to the trigger event. In practice, the accessing of the online store 108 and downloading of the applet take place across the Internet, but accessing the online store is illustrated by dashed line 110, and downloading the applet is illustrated by line 112. After acquisition of the applet by the mobile device 100, the applet is loaded and executed or instantiated by the mobile device 100. The instantiation of the applet includes an indication of the destination location identified by the trigger event, and possibly other information discussed in greater detail below.

Still referring to FIG. 1, the instantiated applet then performs several functions. One function is that the applet determines the initial location of the mobile device 100 using any suitable technology of the mobile device 100. For example, the mobile device 100 may determine its position using signals from the Global Positioning System (GPS) network of satellites. In other cases, the mobile device 100 may determine its position by triangulation using received signal strength indications (RSSI) from three or more cellular towers, including cellular tower 102. Further still, the mobile device 10 may determine its location using indoor navigation beacons, such as Bluetooth Low Energy (BLE) devices or Ultra Wide Band (UWB) devices.

Another function performed by the applet is to send an indication of the initial location of the mobile device 100 and the indication of the destination location to a back-end server or just server 114 by way of the Internet 104. Though the sending is through the Internet, sending the indication of the initial location and the indication of the destination location is illustrated in FIG. 1 by way of dashed line 116.

The server 114 is a computer system, or group of computer systems, accessible by way of the Internet 104. Based on the communication, the server 114 generates a path map that comprises the initial location and the destination location. In example embodiments, the path map is a text-based map encoded with geo-location information (e.g., coded in GeoJSON). The path map covers or encircles an area that includes the initial location and the designation location, but in many cases the path map covers less than all navigable areas represented by a comprehensive map of the area. Generating the path map from the comprehensive map is discussed in greater detail below. The server 114 then sends the path map to the mobile device 100 over the Internet 104, though again the sending is shown by way of dashed line 118 directly between the server and the mobile device 100.

The mobile device 100, and particularly the applet, uses the path map to determine a route from the initial location to the destination location. Once the route is established, the applet provides guidance along the route to the destination location. In example cases, the time duration between the trigger event (e.g., reading the QR code 106 by the mobile device 100) and completion of determining the route by the applet is five seconds or less, in some cases three seconds or less. Stated otherwise, the time duration between the trigger event and the providing the route guidance is in near-real time. The specification now turns, in greater detail, to various aspects, starting with example trigger events.

Trigger Events

As alluded above, the process of providing route guidance starts with a trigger event. The trigger events may take many forms, and various examples are discussed below.

—Bar Codes

In some examples, the trigger event is the reading of a bar code by the mobile device 100. The bar code may be, for example, a one-dimensional bar code or a two dimensional bar code (e.g., QR code 106). As discussed in greater detail below, the bar code encodes several pieces of the information, one of them being the destination location. As bar codes are not human readable, the bar codes are accompanied by wording to indicate the destination location encoded in the bar code.

Figure 2:
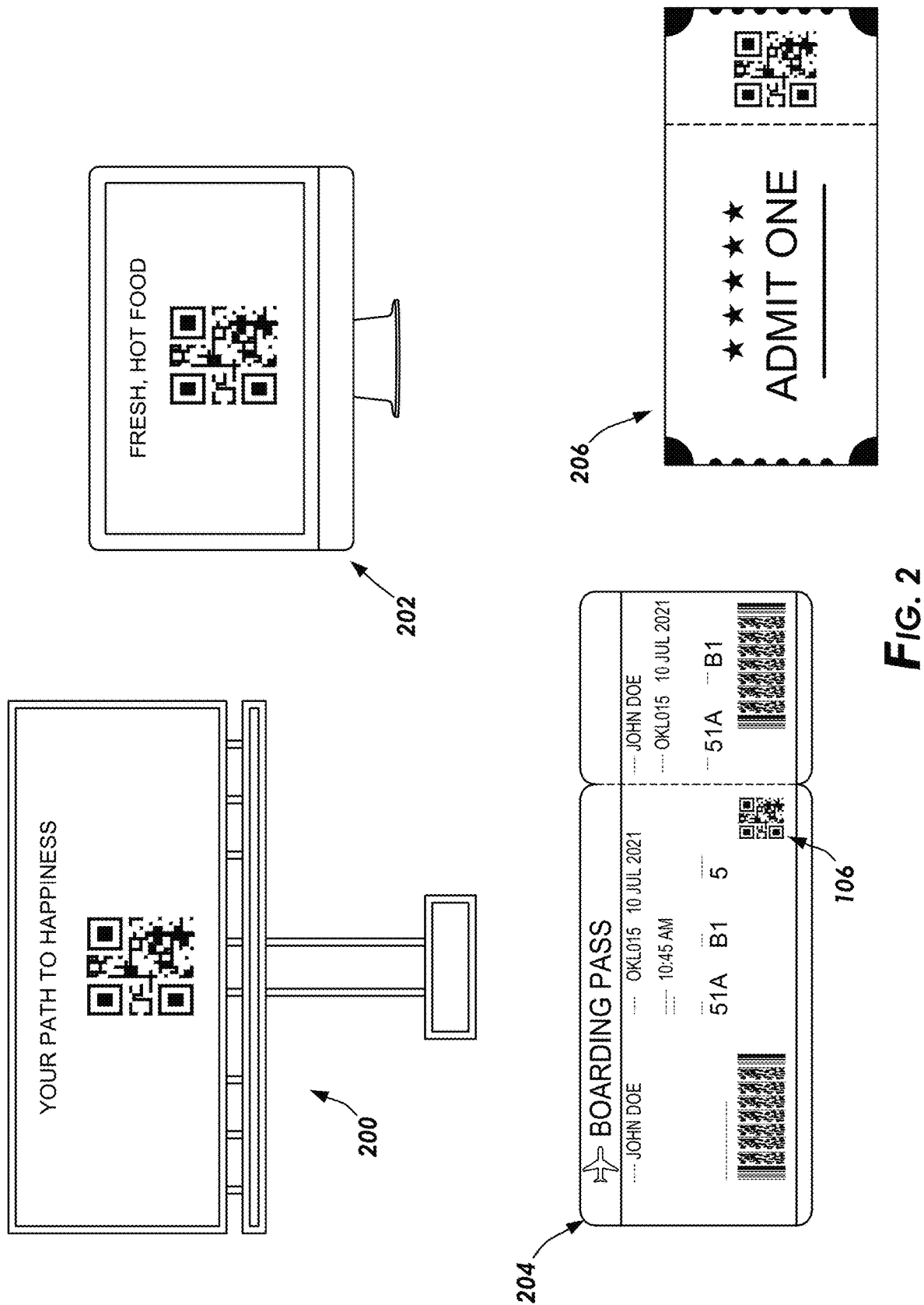
FIG. 2 shows a set of example locations for statically and dynamically displaying bar codes, in accordance with at least some embodiments.

FIG. 2 shows a set of example locations for statically and dynamically displaying bar codes. In particular, FIG. 2 shows a billboard 200 displaying a bar code in the example form of a QR code. Many billboards are static display devices-that is, the message on the billboard can only be changed by a billboard company physically removing and replacing the outward facing components of the billboard. In other cases, billboards themselves are large display devices capable of digitally rendering messages, and thus the billboard 200 of FIG. 2 illustrates both static and dynamic billboard displays.

FIG. 2 further shows a display device 202 (e.g., a computer monitor) displaying a bar code in the example form of a QR code. The display device 202 may be any suitable location. For example, the display device 202 may be located within a person's home, and the bar code may be displayed in association with another program, such as the bar code displayed within a banner or side-bar advertisement. The display device 202 may at a public location, such as an airport, train station, shopping mall, or office center. The bar codes on a display device 202 at a publication location may be associated with an advertising effort, or may provide route guidance associated with the public location (e.g., route guidance to a particular gate, or route guidance to a public restroom). Inasmuch as the display device 202 digitally renders the bar code, the display device illustrates a dynamic display of bar codes, and thus the bar codes can change from time-to-time.

FIG. 2 further shows an example of a static display of the bar code on a functional document in the form of a boarding pass 204. Here, the example boarding pass 204 includes not only bar codes to achieve the purposes of the functional document, but also a bar code (e.g., QR code 106) that may be used for routing associated with the example functional document. In the case of a boarding pass for an airplane, the bar code may be the trigger for route guidance to the boarding gate.

FIG. 2 further shows an example of a static display of the bar code on a functional document in the form of an admission ticket 206. Here, the example admission ticket 206 includes a bar code that may be used for routing to an entrance door and then to one's seat.

—Near-Field Communications (NFC)

The next example trigger event is reading, by the mobile device 100, data using a short-range wireless communication protocol, such as NFC. NFC is a wireless communication protocol that enables communication between two devices over a short range, in some cases 10 centimeters (cm) or less, and in many cases 4 cm or less.

The NFC-enabled device encodes several pieces of the information. For example, the NFC-enabled device may store and provide an identity of the applet and an indication of the destination location. As the data stored by the NFC-enabled device is not human readable, each the NFC device is accompanied by wording to indicate the destination location. While in some cases the NFC-enabled device may be static, in other cases the NFC-enabled device may be dynamically updated. For example, in a shopping mall, and during lunch hours, a display (e.g., display device, LED screen, liquid-crystal display) proximate to an NFC-enabled device may advertise a first restaurant, and the NFC-enabled device may trigger route guidance to the first restaurant. However, the same display and NFC-enabled device may advertise and trigger route guidance to a second, different restaurant during evening hours.

Figure 3:
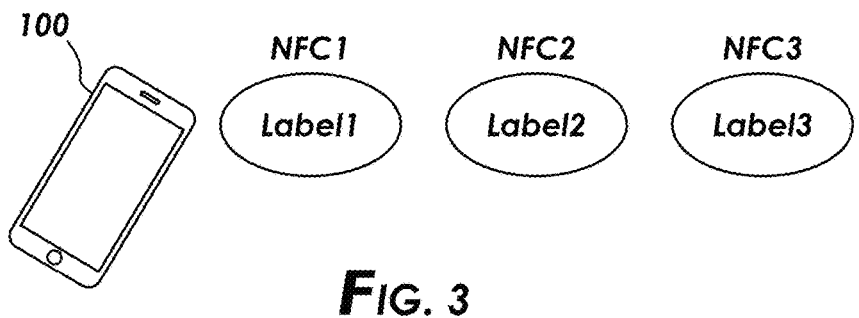
FIG. 3 shows a diagram of example NFC-based triggers, in accordance with at least some embodiments.

FIG. 3 shows a diagram of the example NFC-based triggers. In particular, visible in FIG. 3 is the mobile device 100, and three example NFC-enabled devices, NFC1, NFC2, and NFC 3. In the example, each NFC-enabled device is associate with a label, designated as Label1, Label2, and Label3 for the NFC-enabled devices NFC1, NFC2, and NFC 3, respectively. Again, when the labels are dynamic, those labels may take any suitable form.

In use, the owner of the mobile device 100 selects route guidance based on the labels. Once the mobile device 100 is placed near the selection, the mobile device 100 reads the data from the NFC-enabled device, and thereby triggers the process of downloading and executing the applet, sending information to the server by the applet, receiving the path map, determining a route by the applet using the path map, and providing route guidance.

Figure 4:
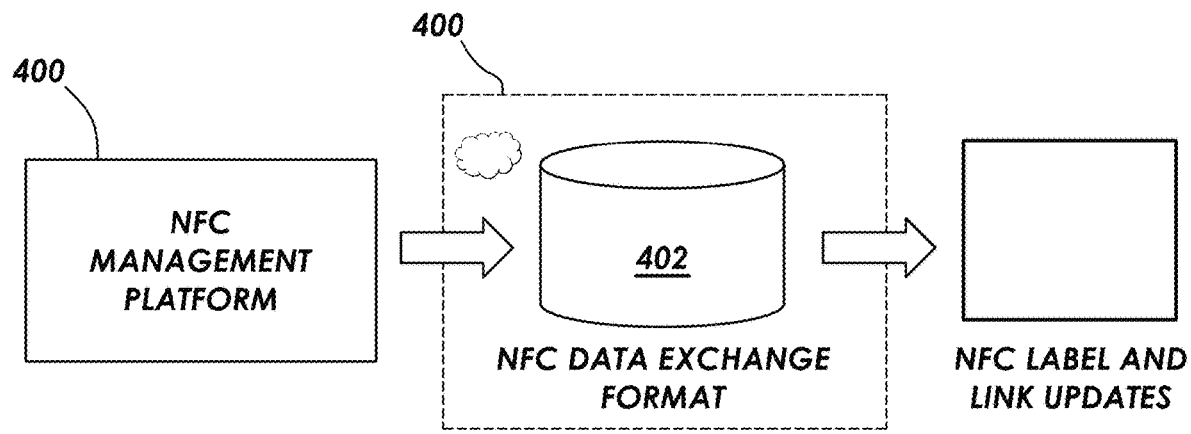
FIG. 4 shows a block diagram of an example system to update the data of the NFC-enabled devices and the corresponding labels, in accordance with at least some embodiments.

FIG. 4 shows a block diagram of an example system to update the data of the NFC-enabled devices and the corresponding labels. In particular, FIG. 4 shows an NFC Management Platform 400. The NFC Management Platform 400 may take any suitable form, such as a computer system of group of computer systems programmed to periodically update the data within NFC-enabled devices, and correspondingly update their labels. The NFC Management Platform 400 is communicatively coupled to an NFC Data Exchange Format 402 device. The NFC Data Exchange Format 402 device may take any suitable form to enable the communication between the NFC Management Platform 400 and the NFC-enabled devices and their respective labels. In cases in which the NFC-enabled devices are themselves computer systems, the NFC Data Exchange Format 402 device implements any suitable communication product, including hard-wired and wireless communication protocols. In cases in which the NFC-enabled devices are passive but updatable devices (e.g., similar to passive RFID tags), the NFC Data Exchange Format 402 device may be a dedicated device used to power and update the data within the NFC-enabled devices.

—Geo-Fencing

Figure 5:
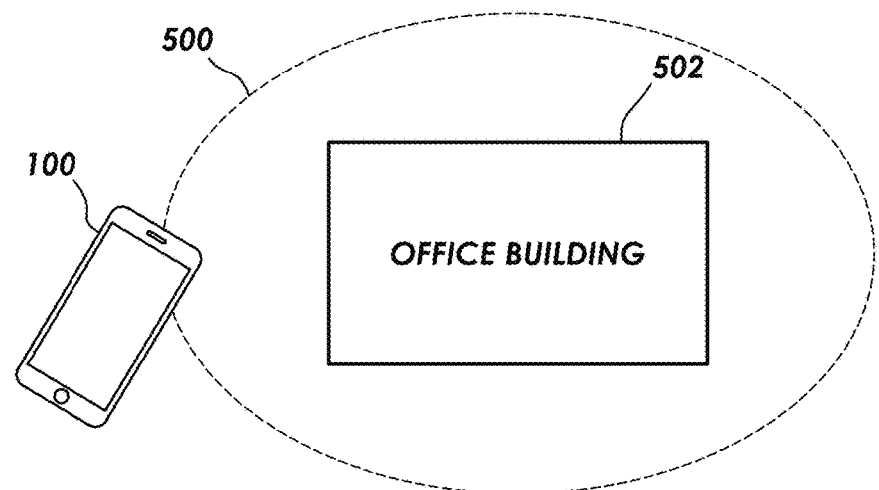
FIG. 5 illustrates crossing an example geo-fence boundary as a trigger event, in accordance with at least some embodiments.

The next example trigger event is the mobile device 100 crossing a geo-fence boundary. FIG. 5 illustrates crossing an example geo-fence boundary as a trigger event. In particular, FIG. 5 shows the mobile device 100 crossing a previously established geo-fence boundary 500 around an example office building 502. In various examples, monitoring the location of the mobile device 100 in relation to the geo-fence boundary 500 may be by way of a trigger application previously installed on the mobile device 100, but where the trigger application is a separate and distinct program from the applet. In particular, the geo-fence boundary 500 may be created by the owner of the mobile device 100 in advance, or the geo-fence boundary 500 may be established by another program, such as the server 114 (FIG. 1) communicating with the trigger application executing on the mobile device 100. The trigger application then monitors the location of the mobile device 100 in relation to the geo-fence boundary 500. When the geo-fence boundary 500 is crossed, the trigger application causes download of the applet and determination of the route guidance as discussed above.

In one example, the mobile device 100 crossing the geo-fence boundary triggers a short message service (SMS) message to be delivered to the mobile device, the SMS message having a link that identifies the applet and contains an indication of the destination location. In most cases, the destination location resides within the geo-fence boundary 500, but such is not strictly required. If the owner so chooses, the link within the SMS message may be activated, which causes the mobile device 100 to acquire the applet, send the data to the server, receive the path map, determine a route, and provide route guidance.

Having the trigger application use the SMS message as the mechanism to provide route guidance is merely an example. The trigger application may cause the download of the applet, and instantiate the applet, in any suitable form. The form of the trigger and download may vary based on the operating system of the mobile device. For example, a mobile device executing an Apple® IOS operating system may trigger the download of the applet and instantiate the applet using a different method than a mobile device executing an Android® operating system.

Identifying and Downloading the Applet

Regardless of the trigger event, the trigger event causes the applet to be downloaded from the online store 108, and causes the applet to be instantiated with at least the indication of the destination location. Triggering the download of the applet may take many forms. In some cases, the operating system of the mobile device 100 is designed and constructed to check for applets associated with a domain name for a website. In other cases, the data associated with the trigger event (e.g., read from the QR code, or read from the NFC-enabled device) directs the mobile device 100 to the appropriate online store 108 (FIG. 1) and identifies the applet. Each is discussed in turn.

—Operating System Redirect

Many operating systems for mobile devices are designed and constructed to, when possible, execute a requested function by use of an application or applet, rather than perform the function within the context of the web browser. To that end, many operating systems automatically check for the existence of an application or applet within an online store based on a domain name within an http request. Some example implementations of providing route guidance in near-real time leverage the inherent functionality of the operating system as the mechanism to identify and download the applet used for determining and providing route guidance. Consider, as an example, that a trigger event provides the following link to the mobile device:

https://x.pointr.tech/license_token-[TOKEN]&destination=[DESTINATION].

In some examples, the operating system of the mobile device 100 does not immediately attempt to reach the location associated with the http request; rather, the operating system of the mobile device 100 analyzes the domain name within the link (e.g., x.pointr.tech) to determine whether the domain name is associated with an application or applet available in the online store 108. In some cases, the association of the domain name with an application or applet is not held or stored within the mobile device 100; rather, the operating system of the mobile device 100 is designed and constructed to communicate with an association server that correlates domain names with applications or applets available in the associated online store. The association server conceptually operates in much the same way as a domain name server that resolves domain names into internet protocol addresses (IP addresses).

If there is an application or applet associated with the domain name, the operating system is designed and constructed to download the application or applet from the online store 108 (FIG. 1), and then instantiate the application or applet with the information of the license_token and the destination. In the event the operating system cannot resolve the identity of the applet from the domain name, the operating system likely then accesses the website indicated by the http request (e.g., x.pointr.tech), and the website redirects to the online store within an indication of the identity of the applet.

—Link to the Applet in an Online Store

In other cases, the data encoded within the QR code or stored on the NFC-enabled device more directly identifies the applet within the online store 108. For example, in some cases the trigger event results in the mobile device 100 being provided a link directly to an online store 108 (FIG. 1) including identifying the applet. Consider, as an example, the following link to an applet in an online store associated with Apple® IOS operating systems:

appclip.apple.com/
id?tech.pointr.maps.express&license_token=[TOKEN]&destination=[DESTINATION].

The example link directs the mobile device to the online store associated with Apple® IOS operating systems (e.g., appclip.apple.com), identifies a particular applet (e.g., tech.pointr.maps.express), and includes the license token and destination information used when instantiating the applet. As another example, consider the following link to an applet in an online store associated with Android® operating systems:

play.google.com/apps/
instant?id=com.pointr.express&&license_token=[TOKEN]&destination=[DESTINATION].

The example link directs the mobile device to the online store associated with Android® operating systems (e.g., play.google.com), identifies a particular applet (e.g., com.pointr.express), and includes the license token and destination information used when instantiating the applet.

Regardless of the precise mechanism by which the applet is identified and downloaded from the online store 108 (FIG. 1), once the applet is acquired by the mobile device 100, the applet is instantiated and provided the license token and destination information. Stated otherwise, the applet is executed by a processor of the mobile device 100, and the applet is provided with the license token and destination information. The specification now turns in greater detail to the applet.

Applet

Figure 6:
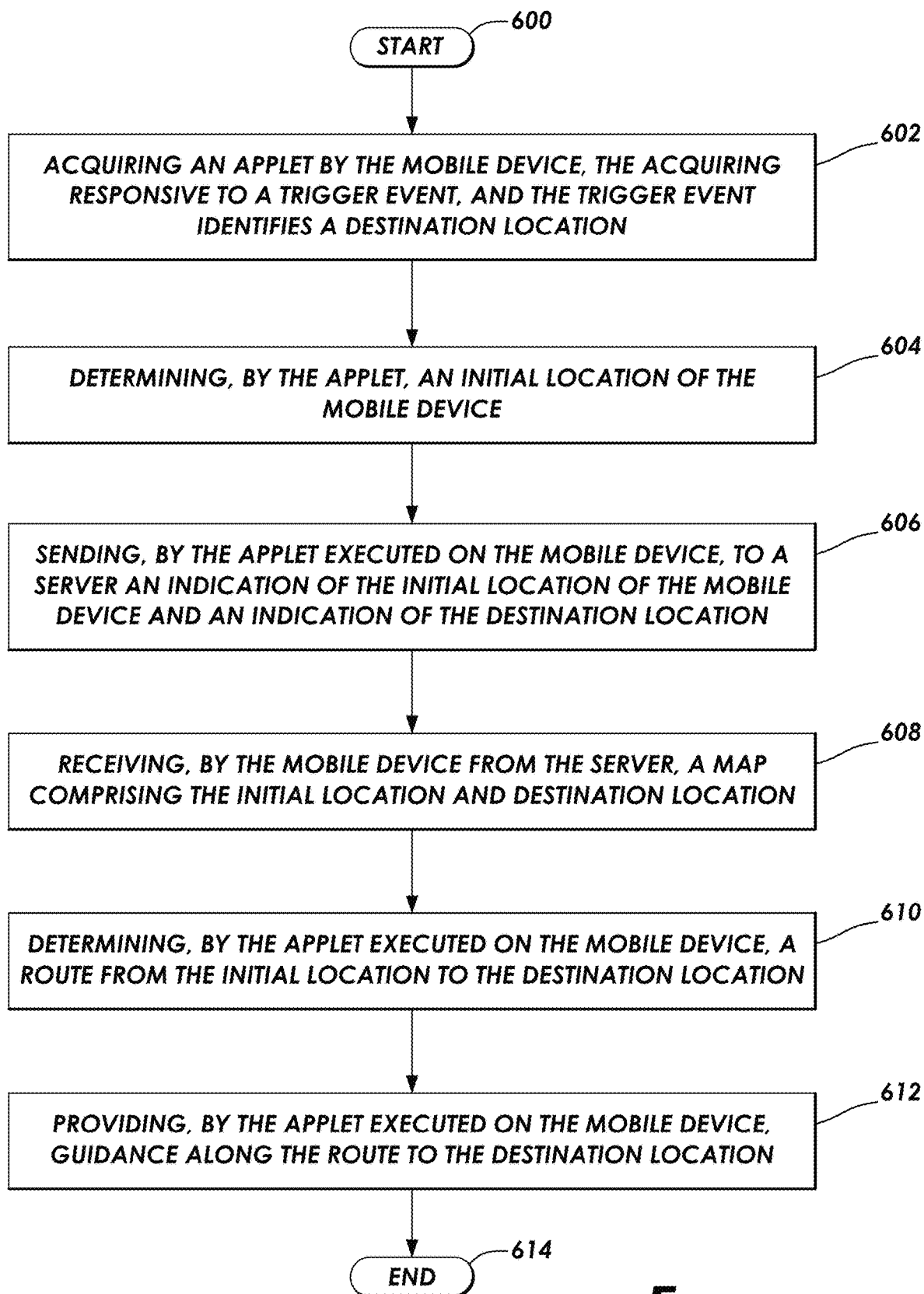
FIG. 6 shows a method in accordance with at least some embodiments.

In order to introduce the applet, the specification presents a method diagram showing various functions. In particular, FIG. 6 shows an example method of providing route guidance in accordance with at least some embodiments. The example method starts (block 600) and proceeds to acquiring the applet by the mobile device, the acquiring responsive to a trigger event, and the trigger event identifies a destination location (block 602). Example aspects of the acquiring are discussed in the sections immediately above and will not be repeated again here so as not to unduly lengthen the specification.

The next step in the example method is the applet determining an initial location of the mobile device (block 604). In particular, the applet is executed by a processor of the mobile device 100, and an initial location of the mobile device 100 is determined. For example, the mobile device 100 may determine its position using signals from the GPS network of satellites, by triangulation using RSSI from three or more cellular towers, by using indoor navigation beacons (e.g., BLE devices or UWB devices), and/or some combination of these. The initial location determined by the applet is thus the starting location for route guidance to the destination. That is to say, given the variants of the potential trigger events, the initial location of the mobile device 100 cannot necessarily be inferred from the trigger event. Thus, the applet determines the initial location as a precursor to providing route guidance.

The next step of the example method is the applet sending to a server 114 an indication of the initial location of the mobile device and an indication of the destination location (block 606). In particular, the applet is started or instantiated with various pieces of information summarized above as a license token and destination information. Each is addressed in turn.

—License Token

In many cases, the providing of route guidance to the user of the mobile device 100 is free to the user, but the overall service itself may not be free. That is, building owners, building management companies, and/or operators of large facilities may contract with a service provider to provide the route guidance to customers and employees to enhance the experience within the facilities. It follows that the license token provided by the trigger event may be used to identify the client for the route guidance service, and may also provide additional information related to the route guidance service. The license token provided as part of the trigger event may take the following example form:

license token=[Client_ID, License_key, comprehensive_map_ID].

The Client_ID is the name or other identifier for the client that is sponsoring or paying for the route guidance services provided to customers and/or employees. That is to say, the Client_ID does not necessarily identify the user of the mobile device 100, but identifies the entity paying for the route guidance service provided to the user on the mobile device. The next entry in the example license token is the License_key, which in example cases is an encrypted key assigned to or associated with the client. Providing of the path maps by the server 114 (FIG. 1), from which the route guidance is determined by the applet, may be contingent upon the license token including both a valid Client_ID and a valid License_key. In other cases, however, the Client_ID alone may be sufficient to enable the providing of the path maps.

The next piece of information in the example license token is the comprehensive_map_ID, which is an application programming interface or identifier of a comprehensive map of the venue within which route guidance is to be provided. For example, if the venue is shopping mall, the comprehensive map may pertain to or cover all the walkable areas of the shopping mall. If the venue is an airport, the comprehensive may pertain to cover all the walkable areas of airport. Stated otherwise, the comprehensive map may encircle or cover all local-walkable paths and all global-walkable paths of a venue, and thus the comprehensive map includes most if not all initial locations within the venue, and all end or destination locations within the venue.

In some cases, the applet may send the license token unencrypted (notwithstanding the encryption of the License_key). However, in other cases the applet may encrypt the license token using any suitable encryption technology, such as using a public key/private key pair. It is acknowledged that encrypting the license token results in twice or double encryption of the License_key, but such does not necessarily undermine the ability of the server 114 to extract the License_key as part of the decryption.

—Destination Information

The second piece of information sent to the server 114 is an indication of a destination location. The indication of the destination location may take many forms. In some cases, the indication of the destination location may directly indicate the destination, such as a physical address, a building identification and level within the building, a room number within a building, a gate number, or a set of geolocation coordinates. Stated otherwise, the indication of the destination location may identify a location that is static.

In other cases, the indication of the destination location may identify a non-static or run-time determined location. For example, the indication of the destination location may identify a closest fire escape. The identity of the closest fire escape is dependent upon the initial location and the available paths, and thus the determination of the ultimate destination may be determined by the applet at run time after evaluating routes to two or more fire escapes. In these cases, the server 114 may provide a path map encompassing two or more destinations.

Another example of a non-static destination location is a closest non-blocked fire escape, which again may not be the closest fire escape. In these cases, the server 114 may communicate with a third-party service providing information on blocked and/or unblocked fire escapes, and provide to the applet a path map encompassing two or more destinations being unblocked fire escapes. The determination of the ultimate destination may be determined by the applet at run time after evaluating routes to two or more possible destination fire escapes.

Other examples of a non-static destination location are a previously unassigned departure gate for an airplane or previously unassigned departure location for a train. Here again, the server 114 may communicate with a third-party service providing information on the assigned departure gate or departure location, and provide to the applet a path map indicating and encompassing the newly assigned destination location.

Yet still other examples are change of a departure gate for an airplane or change of a departure location for a train. In cases in which the trigger event is digitally rendered, a change of a departure gate or change of a departure location may result in updating the data of the trigger to include the new information. However, when the trigger is itself static (e.g., printed on a boarding pass), the data stored in the trigger cannot be changed to reflect a change of a departure gate or departure. In some examples then, the server 114 may communicate with a third-party service providing information on such matters to determine whether the destination location has changed, and if so the provide the applet a path map indicating and encompassing the changed destination location.

—Applet Receives a Path Map

Still referring to FIG. 6, the next step in the example method implemented by the applet is receiving one or more path maps comprising the initial location and the destination location (block 608). Before getting into more specifics, a brief description of the contents of the path maps, along with delivery options, is in order. Creating the path maps is described in greater detail in the section DETERMINING THE LOCAL-AND GLOBAL-WALKABLE PATHS below.

————————Path Maps

In various examples, the path map(s) provided from the server 114 (FIG. 1) are encoded several sets of information. For example, a path map(s) may show walkable areas, non-walkable areas, global-walkable paths, and local-walkable paths. Each is addressed in turn.

————————Walkable and Non-Walkable Areas

Figure 7:
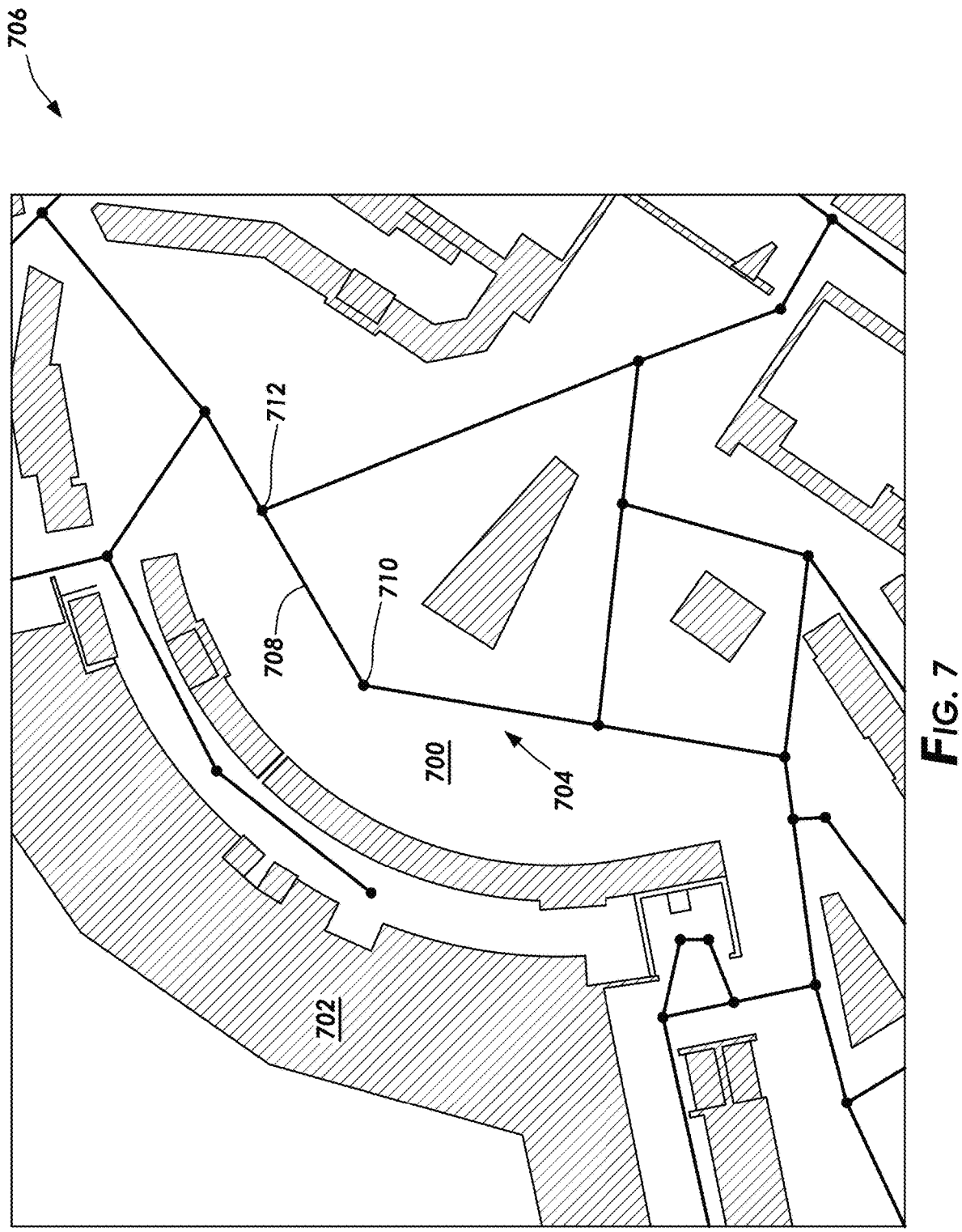
FIG. 7 shows a visual representation of a path map showing global-walkable paths, in accordance with at least some embodiments.

FIG. 7 shows a visual representation of an example path map. Though shown as a visual representation of the path map, in some cases the path maps provided from the server 114 (FIG. 1) are text-based files encoded with geo-location information (e.g., coded in GeoJSON). FIG. 7 shows walkable areas, such as walkable area 700, and non-walkable areas in cross-hatch, such as non-walkable area 702. Walkable areas may include reception areas, hallways, offices, conferences rooms, ballrooms, and breakrooms-areas of the venue or building across which a person may walk or otherwise traverse. Non-walkable areas may include any area that is generally not accessible, such as the space between walls, elevator shafts, air handing rooms, non-public restricted areas, and the like. Inclusion of non-walkable areas is to address situations in which an initial location determined by the applet on the mobile device 100 is within a non-walkable area, such as caused by positional uncertainty of the location determination. That is say, while the mobile device 100 may be located in an otherwise walkable area, because position determination is not necessarily an exact determination, the initial location used by the applet to determine route guidance may incorrectly and inadvertently be within a non-walkable area. The specification discusses in detail below methods to address the situation in which the initial location is shown to be within a non-walkable area.

————————Global-Walkable Paths

The next set of information included in the path map(s) is an indication of the global-walkable paths. FIG. 7 shows an example set of global-walkable paths 704 within the walkable areas. Because FIG. 7 shows the global-walkable paths 704, the path map of FIG. 7 may be referred to as a global-path map 706. The global-walkable paths 704 are a collection line segments or just segments defined by vertices. For example, the segment 708 defines a portion of the global-walkable paths 704, and segment 708 is defined by two vertices, vertex 710 and vertex 712. Segment 708 is shown as a straight line, and in fact all the segments that make up the example global-walkable path 704 are shown as straight lines, but such is not required. Some segments of a global-walkable path may be curved, and thus define by vertices as well as a radius of curvature and a center of curvature.

The example global-walkable paths 704 represent main thoroughfares through the walkable areas. As discussed in greater detail below, to determine route guidance from the initial location to the destination location, and to ease the computational burden of calculating the route, the applet utilizes the global-walkable paths as part of the route guidance when possible.

——————————Local-Walkable Paths

Figure 8:
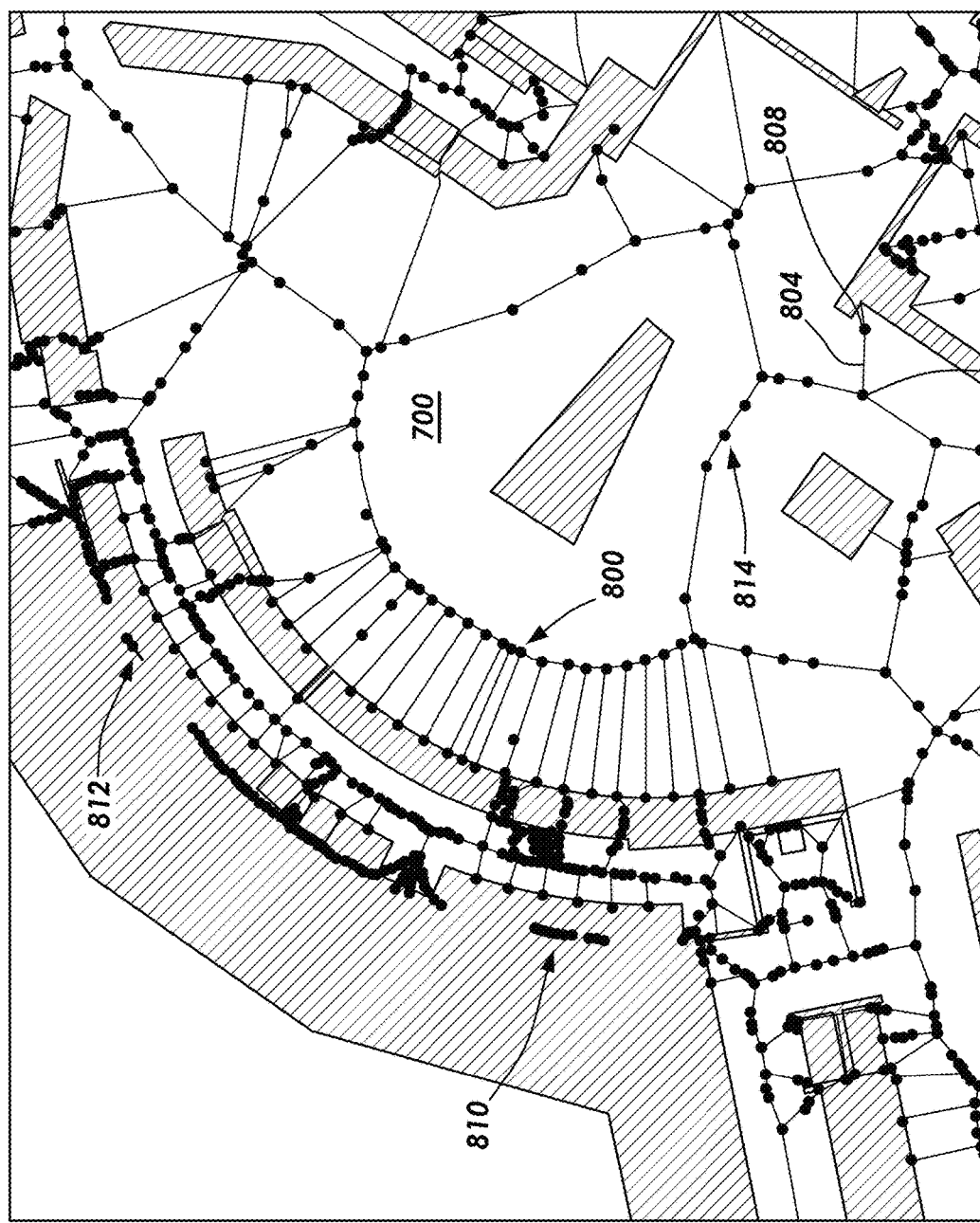
FIG. 8 shows a visual representation of a path map showing local-walkable paths, in accordance with at least some embodiments.

The next set of information included in the path map(s) is an indication of the local-walkable paths. FIG. 8 shows a visual representation of an example path map showing local-walkable paths. Though FIG. 8 is shown as a visual representation of the path map, as before such a path map may be provided from the server 114 as a text-based file. In particular, FIG. 8 shows an example set of local-walkable paths 800 within the walkable areas 700. Because FIG. 8 shows the local-walkable paths 800, the path map of FIG. 8 may be referred to as a local-path map 802. The local-walkable paths 800 are a collection of segments defined by vertices. For example, the segment 804 defines a portion of the local-walkable paths 800, and segment 804 is defined by two vertices, vertex 806 and vertex 808. Segment 804 is shown as a straight line, and in fact all the segments that make up the example local-walkable paths 800 are shown as straight lines, but such is not required.

Local-walkable paths, such as local-walkable paths 800, represent non-main or feeder paths through the walkable areas. The local-walkable paths 800 can be considered feeder paths to and from the global-walkable paths.

——————————Variations of Delivery of Path Maps

The server 114 provides path map(s) to the applet responsive to the communication from the applet. In terms of how path map(s) are provided, and the area covered or represented in the path map(s), the providing of path map(s) may have many variations. In one example, upon request of the applet, the server 114 may provide a single path map showing or encircling both the initial location and the destination location, and including all the local-walkable paths and all the global-walkable paths in the represented area. In other cases, to reduce the size of the path map, the server may generate and send a single path map with global-walkable paths shown, but limiting the local-walkable paths to: local-walkable paths within a predetermined distance of the initial location (e.g., predetermined radius from the initial location); and local-walkable paths within a predetermined distance of the destination location (e.g., predetermined radius from the destination location).

In other cases, the server 114 may provide separate and distinct path maps, with one path map including the global-walkable paths (i.e., the global-path map), and a second path map showing the local-walkable paths (i.e., the local-walkable paths). In such cases, the global-path map may show or encircle a particular area, and the local-path map may show or encircle the same particular area. In other cases, however, the encircled area as between the global-path map and the local-path map need not be coextensive. For example, and for reason regarding how the applet determines the route, the global-path map may encircle an area in which the initial location and the destination location each reside on the boundary, while the local-path map may encircle a larger area, such as to encompass the area define within a predetermined distance from each of the initial location and the destination location. It is noted that, for relatively small venues (e.g., shopping center), the server 114 may return path map(s) that show all the covered areas of a comprehensive map for the venue, thus reducing the amount of time it takes the server 114 to provide the path maps. However, in other cases the server 114 may be designed and programmed to pare down or reduce the data from comprehensive maps to produce the path map(s) (i.e., the path map(s) encircle a smaller area than the comprehensive maps from which they are derived). The discussion now turns determining a route by the applet.

—Determining a Route

Returning to FIG. 6, the next step in the example method is determining a route from the initial location to the destination location (block 610). Determining the route from the initial location to the destination location is performed by the applet executing on the mobile device 100, and is based on the local-walkable paths and global-walkable paths from the path map(s). For purposes of this discussion, it will be assumed that the server 114 returns a single or merged path map comprising indications of the walkable areas, the non-walkable areas, the local-walkable paths, and the non-walkable paths. However, with the benefit of this disclosure, a person of ordinary skill in the art would understand the route guidance determination based on separate and distinct local-path maps and global-path maps. The example method starts with finding a local-walkable path near the initial location.

——————————Local-Walkable Path Near the Initial Location

In some situations, the initial location falls directly on a local-walkable path, and thus no specific finding of a local-walkable path is needed. However, in other situations the initial location may be within a walkable area, yet not on a local-walkable path. In yet still other situations, the initial location may be within a non-walkable area, or because of positional uncertainty of the location determination, may appear to be within a non-walkable area. In either case, the applet is designed and programmed to find a local-walkable path. Each situation is addressed in turn.

——————————Initial Location in Walkable Area

Figure 9:
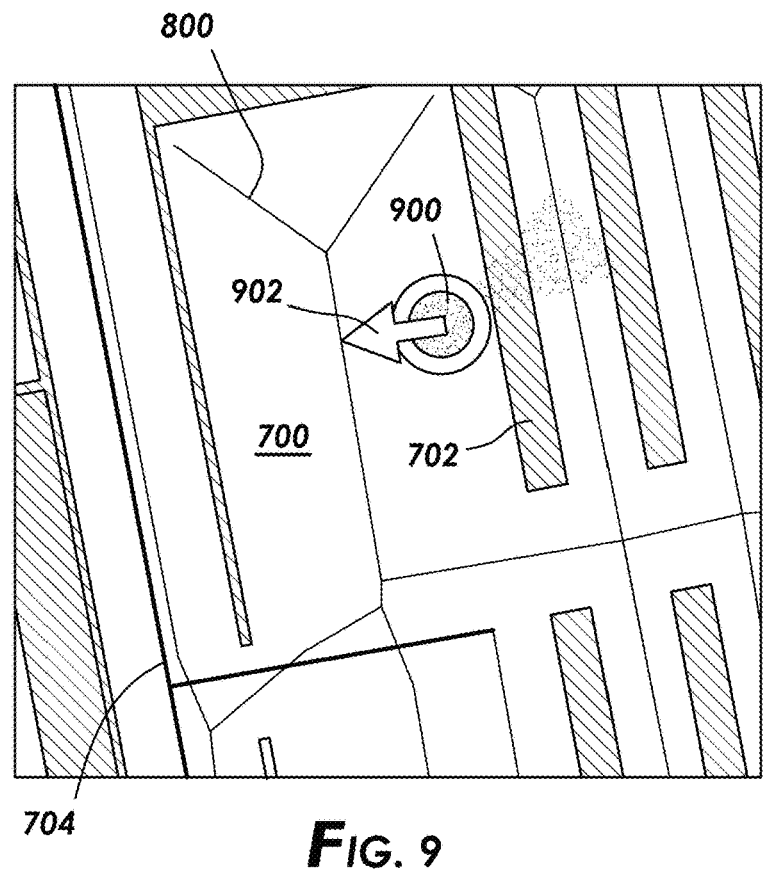
FIG. 9 shows a visual representation of a path map with respect to finding a local-walkable path, in accordance with at least some embodiments.

FIG. 9 shows a visual representation of a path map with respect to finding a local-walkable path when the initial location is in a walkable area. In particular, in situations in which the initial location is within a walkable area, yet not on a local-walkable path, the applet is designed and programmed to find a nearest local-walkable path. Thus, FIG. 9 shows a path map comprising walkable areas 700, non-walkable areas 702, local-walkable paths 800, and global-walkable paths 704. An initial location 900 is shown disposed at a location that is within a walkable area 700, yet not located on a local-walkable path 800.

In example cases, the applet finds a local-walkable path 800 that is near the initial location. More specifically, the applet finds a local-walkable path 800 that is near the initial location, and where the path between the initial location and local-walkable path resides within the walkable area 700. Stated another way, in various examples the applet is designed and programmed to find a nearest local-walkable path in which a straight-line distance between the initial location 900 and the local-walkable path does not cross a non-walkable area 702. Thus, an initial part of the route from the initial location 900 to the destination location contains a route segment 902 (shown by an arrow in the figure) from the initial location to the local-walkable path 800.

Initial Location in Non-Walkable Area

Figure 10:
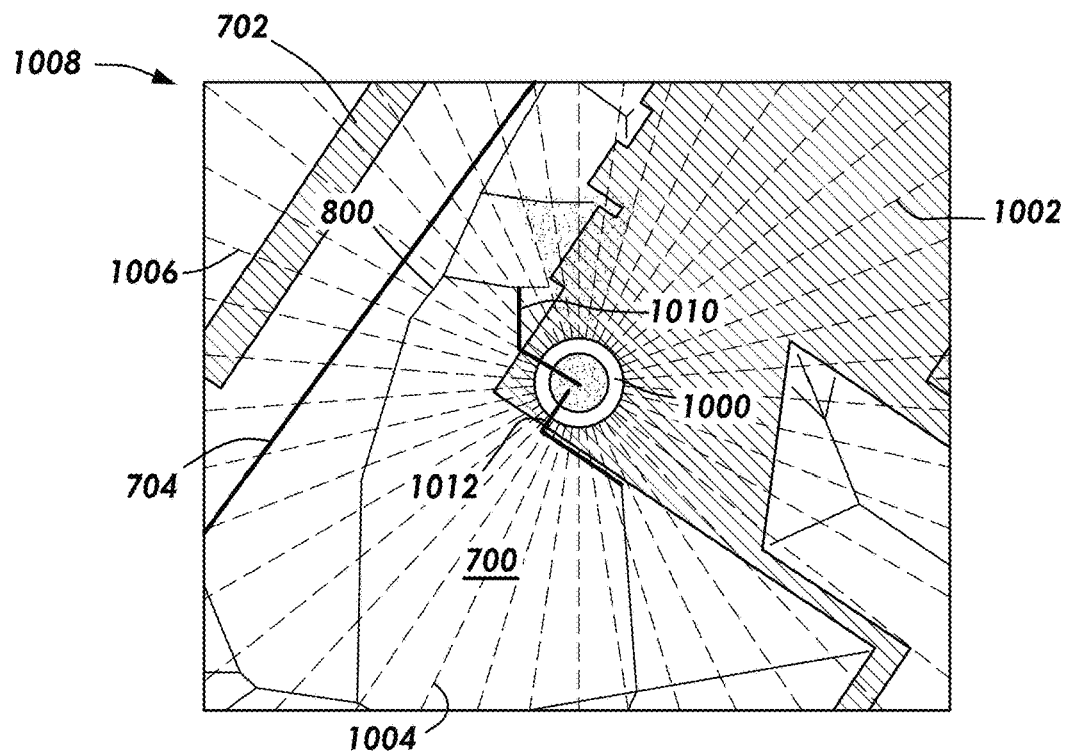
FIG. 10 shows a visual representation of a path map with respect to finding a local-walkable path when the initial location is within a non-walkable area, in accordance with at least some embodiments.

FIG. 10 shows a visual representation of a path map with respect to finding a local-walkable path when the initial location is within a non-walkable area. In particular, FIG. 10 shows a path map comprising walkable areas 700, non-walkable areas 702, local-walkable paths 800, and global-walkable paths 704. The example initial location 1000 is within a non-walkable area 702.

In example cases, the applet determines that the initial location resides in a non-walkable area 702. Responsive to the determination that the initial location resides in a non-walkable area 702, the applet may be designed and programmed to identify one or more exits from the non-walkable area 702. In some examples, identifying one or more exits is by checking along a plurality of radials from the initial location. FIG. 10 shows a plurality of radial lines emanating from the initial location 1000, such as radial lines 1002, 1004, and 1006 (and other radial lines not specifically numbered). While the example radial lines 1002, 1004, and 1006 are shown superimposed on the portion of the example path map 1008 for purposes of discussion, those radial lines are not necessarily reflected in the text-based data that makes up the path map 1008. In some cases, the checking along a plurality of radials may be take place along radials on ten angular degree increments, and so along 36 total radials, but other angular increments can be used.

In some cases, one or more exit candidates from the non-walkable area are identified based the distance along one or more radials to the walkable areas. For example, the applet may be designed and programmed to calculate a distance along each radial line to a walkable area intersected by that line. Stated otherwise, each radial may be considered an exit candidate, and those exit candidates are evaluated based on the distance from the initial location to the walkable area along the radial. A single exit candidate may be selected as the exit when the distance along a particular radial is shortest distance, or is shortest by a predetermined margin (e.g., three meters). The exit may then be defined as the location at which the selected radial intersects the walkable area. In such cases, the applet may then find a route segment from the exit to the nearest local-walkable path as discussed above.

In other cases, distances along two or more radials may be the same, or may have a length that is within a predetermined margin (e.g., within three meters of each other). In such situations, and in some examples, the multiple exit candidates may be evaluated. In the example of FIG. 10, two radial lines 1004 and 1006 have similar distances from the initial location 1000 to respective portions of the walkable area 700, thus defining two exit candidates. In such situations, the applet may then find candidate route segments for each exit. Stated otherwise, for each exit candidate, the applet may be designed and programmed to find a nearest local-walkable path from the location at which the radial intersects the walkable area 700 to create a candidate route segment from the intersection to the nearest local-walkable path. In some cases, a candidate route segment may be selected based on the length of the route segments (e.g., shortest). In other cases, the route segments may be retained for later evaluation within the overall route determination.

Still referring to FIG. 10, consider for purposes of explanation that the destination location is somewhere above, within the plane of the page, the initial location 1000. Stated otherwise, if North is up in the path map 1008 of FIG. 10, consider that the destination location is North of the initial location 1000. The exit and route segment associated with the radial line 1006, shown by line 1010, intersects a local-walkable path to the North. The exit and the route segment associated with the radial line 1004, shown by line 1012, intersects a local-walkable path to the South. At this stage in determining the route, the applet may have yet to evaluate the overall route, so either route segment may be viable. It follows then, in situations in which the applet does not resolve to a single exit, the applet may retain the viable exits, and evaluate those exits as part of the broader route finding, discussed more below. However, in the example FIG. 10, and with the assumption that the destination location is to the North, ultimately the exit and route segment shown by line 1010 will be selected.

Selecting the Local-Area Route Near the Initial Location

Figure 11:
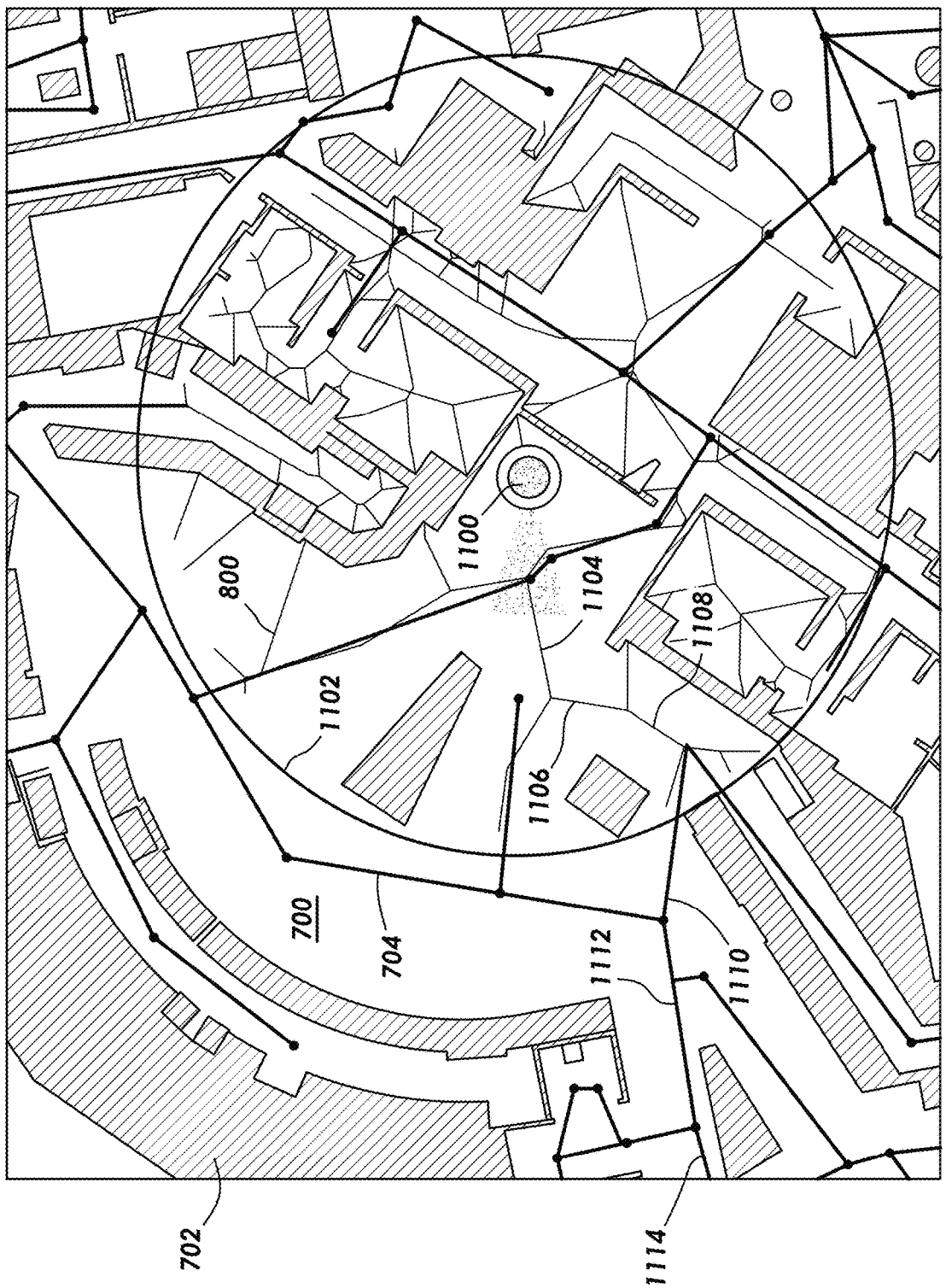
FIG. 11 shows a visual representation of a path map showing global-walkable paths, and within a predetermined distance of an initial location, local-walkable paths, in accordance with at least some embodiments.

FIG. 11 shows a visual representation of an example path map showing global-walkable paths, and within a predetermined distance of an initial location showing the local-walkable paths. Though FIG. 11 is a visual representation of the merged path map, as before such a path map may be provided from the server 114 as a text-based file, and the applet may not necessarily create a visual representation as part of the route planning.

In particular, FIG. 11 shows a floor plan similar to the floor plan of FIGS. 7 and 8, including global-walkable paths 704, non-walkable areas 702, and walkable areas 700. FIG. 11 further shows a subset of the local-walkable paths 800, but here the subset of the local-walkable paths is limited to those local-walkable paths 800 within a predetermined distance of the initial location 1100. In the example of FIG. 11, the predetermined distance is shown as a circle 1102 defining an area swept out by a radius centered at the initial location 1100, but any suitable predetermined distance measure may be used, including non-straight-line measurements along segments of the local-walkable paths 800.

As part of the route determination, the applet utilizes local-walkable paths near the initial location to find paths to one or more global-walkable paths. In the visual example of FIG. 11, the applet is designed and programmed to evaluate the local-walkable paths 800 within the predetermined distance from the initial location 1100 when evaluating the route. Stated otherwise, the applet is designed and programmed to find route segments from the initial location to a global-walkable path 704 using the local-walkable paths 800 within the predetermined distance from the initial location. In the example of FIG. 11, the destination location is not shown, but is to the left side of the figure. Thus, in this example, the applet may select local-walkable path segments 1104, 1106, and 1108 to reach a global-walkable path.

Selecting the Non-Local-Area Route

Once outside the predetermined distance from the initial location, and to ease the computational burden of calculating the overall route, the applet is designed and programmed to only evaluate global-walkable paths for the route until the route evaluation is near destination location. Stated otherwise, once outside the predetermined distance from the initial location, the applet is constrained to evaluating global-walkable paths for the route. In the example of FIG. 11, the applet may select global-walkable path segments 1110, 1112, and 1114 toward the destination (not specifically shown in FIG. 11).

———Selecting the Local-Area Route Near the Destination

As the route calculation continues, the applet is designed and programmed to once again evaluate local-walkable paths within a predetermined distance of the destination location. That is, in various examples, the applet utilizes local-walkable paths near the destination location to find pathways from the selected global-walkable paths to the destination location. No figure is provided showing transition from non-local-area routing to local-area routing near the destination, as such a figure would be largely duplicative of FIG. 11. Stated otherwise, if initial location 1100 is considered a destination location rather than an initial location, FIG. 11 can be considered to visually show a transition from routing initially constrained to global-walkable paths (e.g., path segments 1114, 1112, and 1110) to use of local-walkable paths (e.g., path segments 1108, 1106, and 1104) within a predetermine distance of the destination.

———Routing Algorithm

Within the constraints defined above, the applet may use any suitable route finding mechanism or algorithm to establish the route from the initial location to the destination location. For example, the A* (pronounced A-star) algorithm may be used to evaluate the local-walkable paths and global-walkable paths. Another example is Dijkstra's algorithm. Regardless of the precise routing algorithm used, the routing algorithm evaluates a plurality of possible paths, and selects a path that meets a predetermined criterion, such as the shortest path or the path that takes the least amount of time to traverse.

Figure 12:
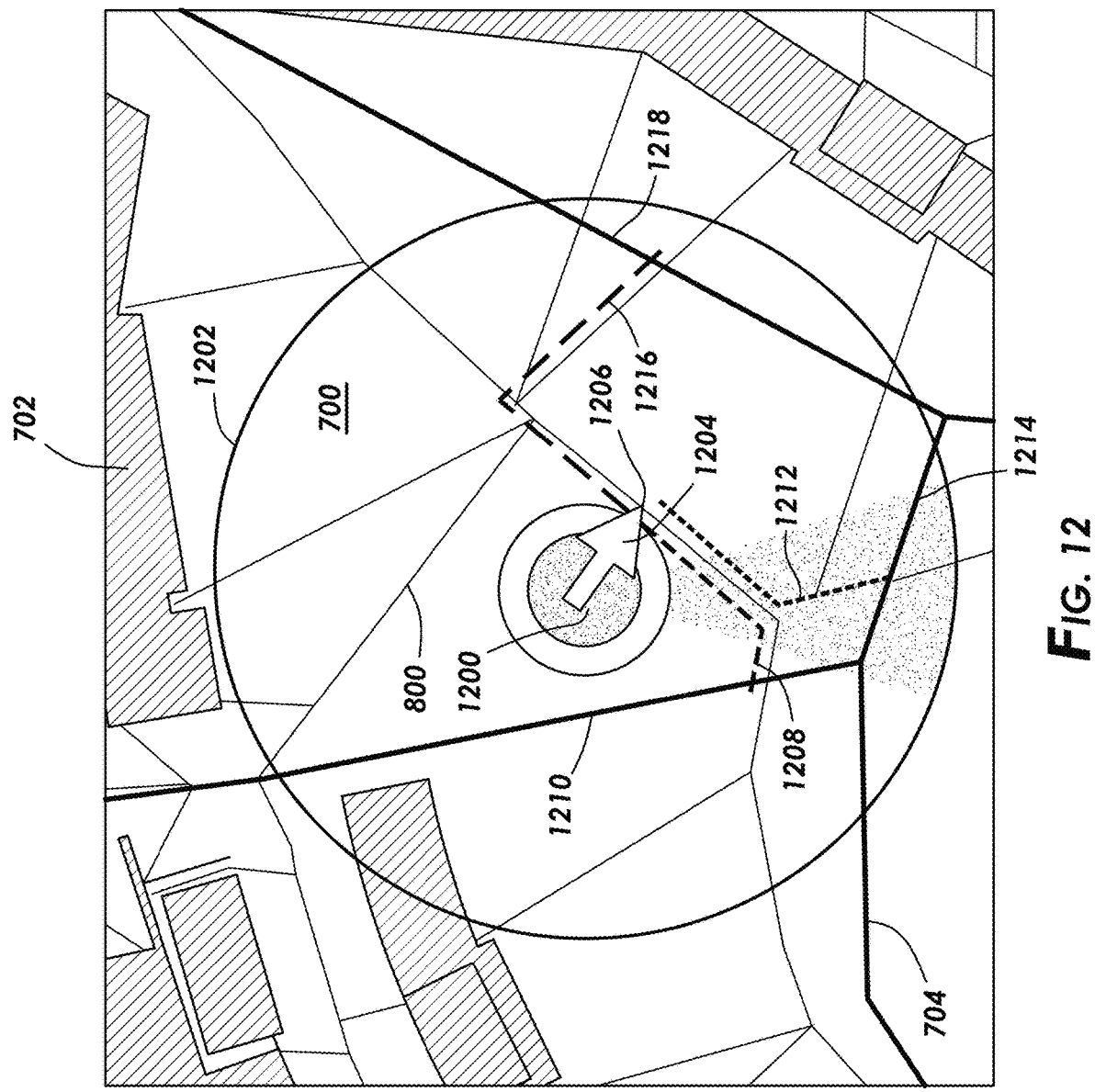
FIG. 12 shows a visual representation of a path map showing local-walkable paths, global-walkable paths, and a plurality of candidate paths, in accordance with at least some embodiments.

FIG. 12 shows a visual representation of a path map showing local-walkable paths, global-walkable paths, and a set of example candidate paths. In particular, visible in FIG. 12 are local-walkable paths 800, global-walkable paths 704, walkable areas 700, and non-walkable areas 702. FIG. 12 further shows an initial location 1200 and a predetermine distance from the initial location 1200 in the form of a circle 1202. Here again, the initial location 1200 does not reside precisely on a local- or global-walkable path, and the applet is designed and programmed to find a nearest local-walkable path, as described above and as illustrated by arrow 1204. From the point 1206, the applet is designed and programmed to evaluate a plurality of possible paths to the destination location (not shown), possibly including evaluating a plurality of path segments to differing ones of the global-walkable paths 704. For example, route segment 1208 traverses from the point 1206 to a global-walkable path 1210. Route segment 1212 traverses from the point 1206 to the global-walkable path 1214. Route segment 1212 traverses from the point 1206 to the global-walkable path 1218. The example applet may analyze all these possible route segments as part of the routing algorithm. The route segment ultimately chosen depends highly on the destination location. For example, for destinations below the area of FIG. 11, the applet is more likely to choose route segment 1212, while for destinations above the area of FIG. 11, the applet is more likely to choose route segment 1208. Stated differently, the applet receives one or more path maps comprising a plurality of paths between the initial location and the destination location. The applet determines a route comprising some but less than all the plurality of paths.

———Unresolved Destination Location

As discussed above, in some cases the destination location is non-static or unresolved, such as the destination location being the closest fire escape, or the closest non-blocked fire escape. In such situations, the server 114 may return one or more path maps with indications or designations of two or more destinations. That is to say, the server 114 may make initial determinations of distance to the designated destinations (e.g., straight-line distance) as a mechanism to resolve the identity of candidate destination locations. The path map(s) returned to the applet may thus designate multiple destinations, and the applet is designed and programmed to select a destination based on a route analysis from the initial location to each of the destination locations. For example, if the selected destination is the closest fire escape, the server may return path map(s) showing two or more fire escape destinations. The applet evaluates routes to each destination, and then chooses the destination whose route meets a predetermined criterion (e.g., shortest route, fastest route). Nevertheless, the route determination to each destination still may implement the determinations above using local-walkable paths within respective predetermined distances of the initial and destination locations, and constrained to global-walkable paths outside the respective predetermine distances.

—Route Guidance

Returning to FIG. 6, the next step in the example method is providing, by the applet executed on mobile device, guidance along the route to the destination location (block 612). In some cases, such guidance comprises creating a visual representation on a display device of the mobile device, the visual representation showing at least the walkable areas, the route, and a current location of the mobile device along the route. Route guidance may alternately or further include a turn-by-turn listing of the route, highlighting the current location along the route. Further still, in addition to or in place of the other guidance, the applet may provide audio directions along the route.

In various examples, the time between the trigger event and the applet providing the route guidance is five seconds or less, in some cases about three seconds. That is, for mobile device operating systems that do not require confirmation before downloading applications or applets from an online store, the time between the trigger event and providing of route guidance is five seconds or less. In situations in which the operating system requires user confirmation before downloading applications or applets, the time between when user of the mobile device confirms or gives permission for the download of the applet and the applet providing route guidance is five seconds or less. Several features may work together to achieve providing the route guidance in five seconds or less, though not all the features need necessarily be present in every case. In some cases, the applet is a relatively small program, about 15 megabytes or less. By contrast, full applications downloadable from the online store may be hundreds of megabytes to a gigabyte or more. Thus, the time duration it takes to download the applet is short. Another possible feature assisting in the speed at which route guidance is provided is the path map(s). That is, in various examples the path map(s) are text-based maps and thus have relatively small size. Moreover, in some cases the server 114 provides the path map(s) in truncated form compared to the all-encompassing or comprehensive maps of the venue. Providing the path map(s) encircling only the areas of interest thus further reduces the size of the path maps, which reduces the download time and the amount of memory used by the applet to perform the route determinations.

After the providing of route guidance (block 612), the example method ends (block 612), likely to be re-started on the next instantiation of the applet. Operating systems for mobile devices have the ability to delete applications or applets after a predetermined amount of time (e.g., three days) or on a certain date. In some cases, the applet is deleted from the mobile device after use (e.g., three days after initial download). However, in cases in which a user causes another trigger event during a period of time in which the applet resides on the user's mobile device, operating system of the mobile device will directly instantiate the applet, rather than re-acquiring the applet from the online store. Other than omitting the acquisition step because the applet is already present on the mobile device, the providing of route guidance in such a circumstance is the same.

The specification now turns to considerations regarding the server 114 (FIG. 1).

Server Functions

Returning briefly to the FIG. 1. The server 114 performs many functions in the overall system. The functions of the server 114 may be conceptually organized into: creating or generating the local-walkable paths and the global-walkable paths from floor plans provided to the server 114; and supporting the applet in providing of route guidance in near-real time, hereafter runtime support. Each is addressed in turn, starting with the runtime support.

—Runtime Support

Figure 13:
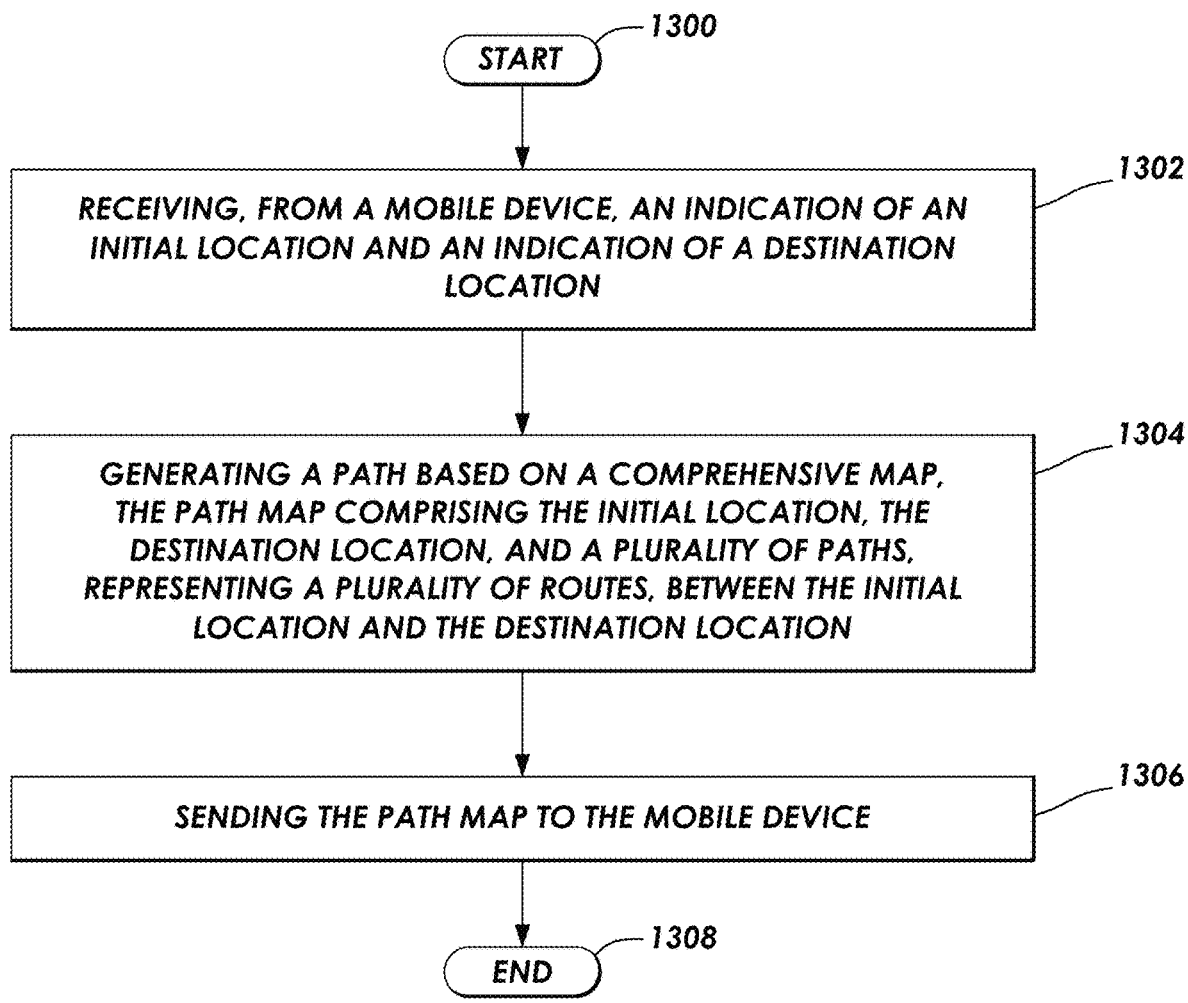
FIG. 13 shows a method in accordance with at least some embodiments.

FIG. 13 shows an example method from the perspective of the server 114 providing runtime support. In particular, the method starts (block 1300) and comprises receiving, from a mobile device, an indication of an initial location and an indication of a destination location (block 1302). The indication of the initial location may be a geolocation in any suitable geodetic reference frame, such as the World Geodetic System 1984 or the North American Datum 1983, to name a few. In other cases, the initial location may be a geolocation referenced to an indoor navigation system. Regardless, the initial location forms the starting point for determining and providing route guidance.

As discussed above, the indication of the destination location may take many forms. In some cases, the indication of the destination location may directly indicate the destination, such as a physical address, a building identification and level within the building, a room number within a building, a gate number, or a set of geolocation coordinates. Stated otherwise, the indication of the destination location may identify a location that is static.

In other cases, the indication of the destination location may identify a non-static or run-time determined location. When the server 114 receives an indication of a non-static destination location, the server 114 resolves the non-static location to a physical location and assigns the physical location to be the destination location for further processing. Examples of a non-static destination location include a previously unassigned departure gate for an airplane or previously unassigned departure location for a train. In such circumstances, the server 114 may communicate with a third-party service providing information on the assigned departure gate or departure location, and assign the physical location to be the destination location for further processing.

Other examples of a non-static destination location are change of a departure gate for an airplane or change of a departure location for a train. That is, if the trigger is static (e.g., printed on a boarding pass), the data stored in the trigger may not reflect later-changed information regarding the departure gate or departure location. In some examples, the server 114 may communicate with a third-party service providing information on such matters to determine whether the destination location has changed, and if so assign the physical location of the changed/updated destination to be the destination location for further processing.

Yet another example of a non-static destination location is a destination location that is based on the initial location. In such situations, the identity of the destination location is dependent not only upon the initial location, but also on the available paths. In these situations, the server 114 may make distance determinations to choose two or more possible destination locations. In keeping with the operational philosophy that the applet executing on the mobile device 100 determines the final route, the distance determinations made by the server 114 to determine the candidate destination locations are not necessarily the route determinations performed by the applet. Stated otherwise, the server 114 may not run the A* algorithm or similar routing algorithm; rather, the server 114 may use another measure or criterion, such as a straight-line distance that ignores the walkable and non-walkable area distinction and/or does not attempt to follow the local- and global-walkable paths. Thus, in some cases the server 114 determines a plurality of physical locations, and assigns the destination location to be a set of physical locations. As discussed above, the applet is tasked with choosing the destination location from the set of physical locations. An example of a non-static destination location that is based on the initial location is a request for routing to a closest fire escape. In this example, the server 114 may identify two or more fire escapes based on predetermined criteria, and the further processing by the applet may take into account the routes to each of the two or more possible destination locations, and choose between them.

Another example of a non-static destination location is a closest non-blocked fire escape, which again may not be the closest fire escape. In these cases, the server 114 may communicate with a third-party service providing information on blocked and/or non-blocked fire escapes. From the set of non-blocked fire escapes, the server 114 may pare down the list using any suitable criteria (e.g., straight-line determination), and assign the destination location to be the pared-down set of non-blocked fire escapes. Here again, the applet is tasked with choosing from within the set to resolve or select the destination location.

The providing of route guidance to the user of the mobile device 100 may be a free service to the user, but the overall service itself may not be free. That is, building owners, building management companies, and/or operators of large facilities may contract with a service provider to provide the route guidance to customers and employees to enhance the experience within the facilities. Thus, the server 114 may authenticate each request prior to providing the path map(s). In such cases, the authentication is based on the license token provided from the applet. Again, the license token provided from the applet may take the following example form:

license token=[Client_ID, License_key, comprehensive_map_ID].

Thus, the server 114 may verify the Client_ID against the License_key. If the Client_ID or the License_key are invalid, the server 114 refrains from providing the path map(s) to the requesting applet. If the Client_ID and License_key are authenticated, then the server 114 begins the next phase of the runtime support using a comprehensive map identified in the license token by the comprehensive_map_ID parameter.

In some cases, the applet may send the license token unencrypted (notwithstanding the encryption of the License_key). However, in other cases the applet may encrypt the license token using any suitable encryption technology, such as using a public key/private key pair. It follows, the server 114 may initially decrypt the license key to extract the Client_ID, License_key, and comprehensive_map_ID.

Still referring to FIG. 13, the next step in the example method is generating path map(s) based on the comprehensive map, the path map(s) comprising the initial location, the destination location, and a plurality of paths representing a plurality of routes between the initial location and the destination location (block 1304). In many cases, the comprehensive map covers all the walkable areas of a venue. If the venue is shopping mall, for example, the comprehensive map may cover or encircle all the walkable areas of the shopping mall. If the venue is an airport, the comprehensive may cover or encircle all the walkable areas of airport. Stated otherwise, the comprehensive map may cover or encircle all local-walkable paths and all global-walkable paths of a venue.

However, the route guidance may need or use less than all the areas covered by the comprehensive map. Thus, based on the initial location and the destination location, the server 114 generates path map(s) that cover, encircle, or include the initial location and the destination location(s), and exclude other areas unlikely to be traversed. Stated otherwise, possibly in order to reduce the size of the path map(s) provided to the applet, the server may truncate the data to create the path map(s) provided to the applet. In some cases, a single or merged path map is provided, comprising both the local-walkable paths near the initial and destination locations, and the global-walkable paths between them. In other cases, the server 114 may provide multiple path maps, such as a local-path map comprising the noted local-walkable paths and a global-path map comprising the global-walkable paths between the initial location and the destination location(s).

Still referring to FIG. 13, the server 114 may then send the path map(s) to the applet (block 1306), and thereafter the method ends (block 1308), likely to be restarted on the next request from an applet.

The discussion to this point has assumed that the local-walkable paths and the global-walkable paths are known and contained in one or more comprehensive maps. The discussion now turns to determining the local- and global-walkable paths by the server 114.

—Determining the Local- and Global-Walkable Paths

In accordance with various examples, the server 114 is tasked with determining the local- and global-walkable paths based on a digitized floorplan of the building or venue. Conceptually, determining the local- and global-walkable paths may be divided into a preprocessing step, in which the floorplan is analyzed and simplified. The floorplan may then be subjected to spatial analysis to determine a raw path graph for the walkable areas of the floorplan. In some cases, the raw path graph represents local-walkable paths, though simplification of the raw path graph may be used in some cases to arrive at the local-walkable paths. Moreover, the raw path graph may be subjected to several post-processing techniques to modify and adjust the raw path graph to reveal the global-walkable paths. Each example step is addressed in turn.

———Preprocessing

Figure 14:
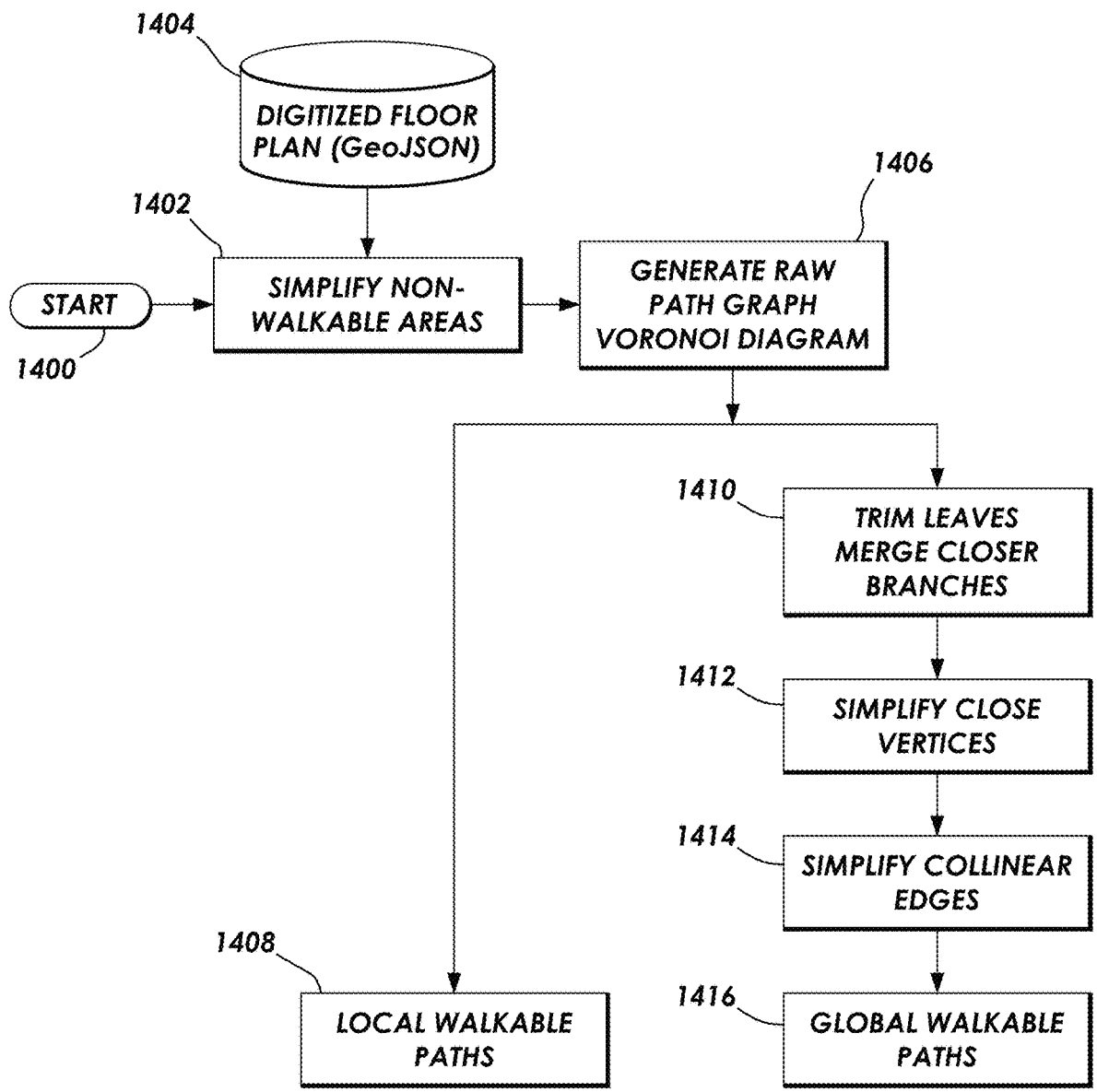
FIG. 14 shows a method of determining the local- and global-walkable paths in accordance with at least some embodiment.

FIG. 14 shows an example method of determining the local- and global-walkable paths. The example method starts (block 1400) and comprises simplifying the non-walkable areas 1402. In particular, the server 114 may receive a floorplan delineating walkable and non-walkable areas, such as receiving a digitized floorplan encoded with geo-location information (e.g., coded in GeoJSON), the digitized floorplan illustrated in FIG. 14 by database 1404. The preprocessing or simplification may take many forms, such as simplifying non-walkable areas, eliminating small polygons, and removing spaces smaller than a predetermined size. Each is addressed in turn.

One example preprocessing step is simplifying non-walkable areas. In particular, the floorplan provided may have non-walkable areas defined by polygons, where some of those polygons overlap. While the resultant walkable areas may be the same in spite of the overlap, the complexity of overlapping polygons defining non-walkable areas not only increases the file size, but also may introduce errors in the later spatial analysis. Thus, in various examples, the server 114 is designed and programmed to identify polygons defining non-walkable areas that overlap. For each set of overlapping polygons, the server 114 performs a unary union or unioning of the overlapping polygons to create a single polygon that covers an area encompassed by the overlapping polygons.

Figure 15:
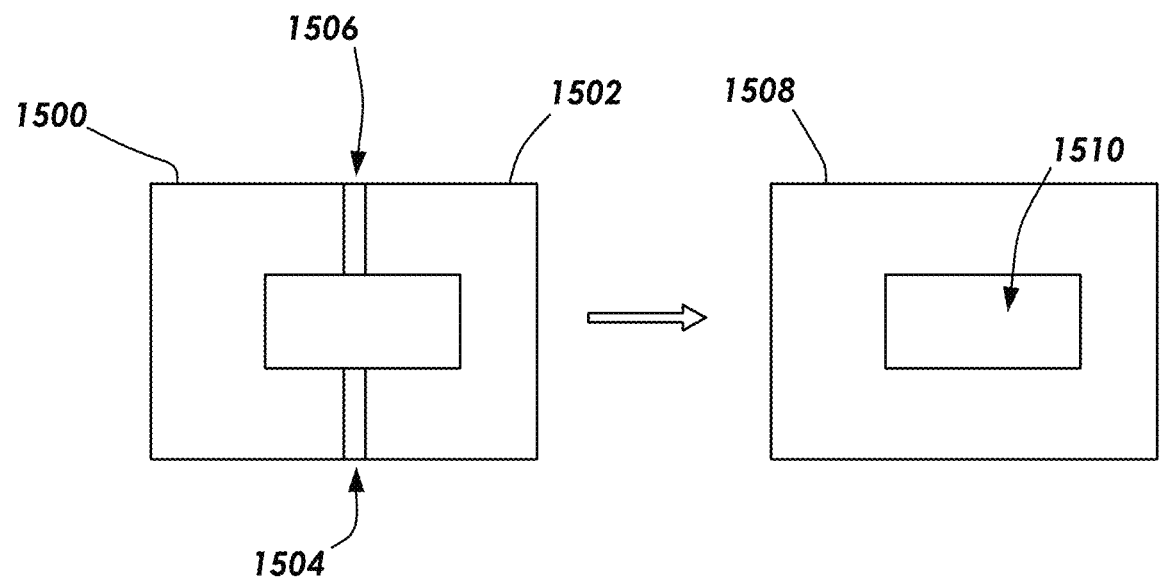
FIG. 15 shows, in block diagram form, an example of simplifying the non-walkable areas, in accordance with at least some embodiments.

FIG. 15 shows, in block diagram form, an example of simplifying the non-walkable areas. In particular, FIG. 15 shows an initial set of polygons 1500 and 1502. The area within the polygons 1500 and 1502 define non-walkable areas, and it follows that the area outside the polygons 1500 and 1502 define walkable areas. The example polygons 1500 and 1502 overlap in regions 1504 and 1506. In accordance with various examples, the server 114 is designed and programmed to perform a unary union operation to generate a single polygon 1508 that covers an area encompassed by the polygons 1500 and 1502. By virtue of the shape of example polygons 1500 and 1502, the resultant polygon 1508 defines an internal area 1510. Internal area 1510 may be considered a walkable area, but is not accessible because of the surrounding non-walkable areas of the resultant polygon 1508. The internal area 1510 may be, for example, an elevator shaft or a raised ceiling of a floor below.

The next example simplification is eliminating small polygons. In particular, the digitized floorplan provided from the third party may contain remnants or artifacts that appear to block or impede walkable areas. Stated otherwise, the digitized floorplan may include polygons defining small non-walkable areas that are "islands" within the walkable areas, such as hidden or transparent objects the architect or drafter neglected to remove. However, many such artifacts are too small to be considered when generating the local- and global-walkable paths. Thus, in various examples of the preprocessing, the server 114 may be designed and programmed to remove, from the floorplan, polygons defining non-walkable areas smaller than a predetermined area. In some cases, the predetermined area is fixed, such as 10 $cm^2$ or 20 $cm^2$. In other cases, the predetermined area may be venue dependent. For example, the predetermined area may be larger for large venues, such as the open space within a convention center or warehouse, and smaller for smaller venues, such as commercial office space.

Figure 16:
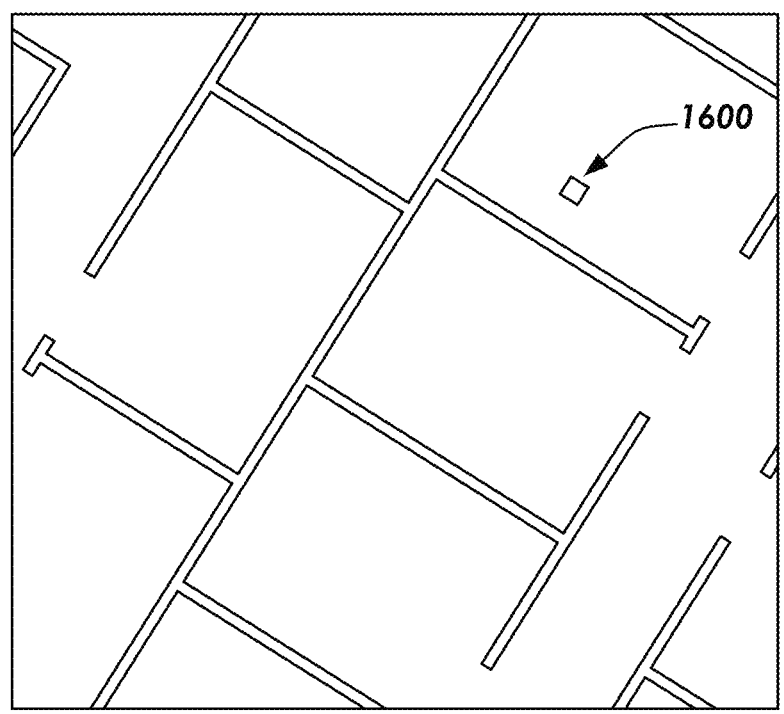
FIG. 16 shows a floorplan with polygon in an otherwise walkable area, where the polygon can be removed in accordance with at least some embodiments.

FIG. 16 shows a floorplan with a polygon as an island in an otherwise walkable area, where the polygon can be removed in the preprocessing. In particular, FIG. 16 shows a floorplan of a commercial office space including a polygon 1600 defining small non-walkable area (e.g., less than 20 $cm^2$). In accordance with at least some embodiments, as part of the preprocessing, the server 114 is designed and programmed to remove the polygon 1600 as being smaller than the predetermined area. Thus, later analyses will not be affected by the small non-walkable area that would not significantly hamper navigation.

The next example simplification is removing walkable areas that are, in practice, too small or narrow for human navigation. Such narrow walkable areas thus should not be considered when finding the local- and global-walkable paths. In various examples, the server 114 is designed and programmed to identify walkable areas that have a smallest dimension equal to or smaller than a predetermined length (e.g., 20 cm). For each walkable area meeting the criterion, the walkable area is removed from the floorplan. In one example, removing the walkable area may involve expanding one or more polygons defining non-walkable areas to remove the walkable area.

FIG. 17 shows example floorplans to describe removing walkable areas. In particular, floorplan portion 1700 on the left illustratively shows an office space having a walkable area 1702 with a smallest dimension smaller than a predetermined length. In particular, while from the standpoint of the floorplan the walkable areas 1702 may have a vertical height being the same as the connected office space (e.g., eight feet, ten feet), in this example the entrance width W is smaller than the predetermined length (e.g., 20 cm). Thus, in various examples the server 114 is designed and programmed to identify the walkable area 1702, and to remove the walkable area 1702 from the floorplan. Removing the walkable area 1702 may take any suitable form, such as expanding or dilating one or more polygons to encompass the area formerly defined by the walkable area 1702. Floorplan 1710 on the right illustratively shows the example office space after the removal of the walkable area 1702

——————Spatial Analysis for Local-Walkable Paths

Returning to FIG. 14, the next step in the example method is performing spatial analysis regarding the walkable areas to generate a raw path graph for the walkable areas (block 1406). The path graph that emerges from the spatial analysis comprises a plurality of segments defined by vertices. Some of the segments are "dead end" segments that end at a non-walkable area. Other segments share vertices with the contiguous segments such that the segments define partial paths through the walkable areas. The raw path graph may be considered a Voronoi Diagram, and any suitable algorithm may be used to generate the raw path graph, such as Fortune's Algorithm or Delaunay Triangulation.

Figure 18:
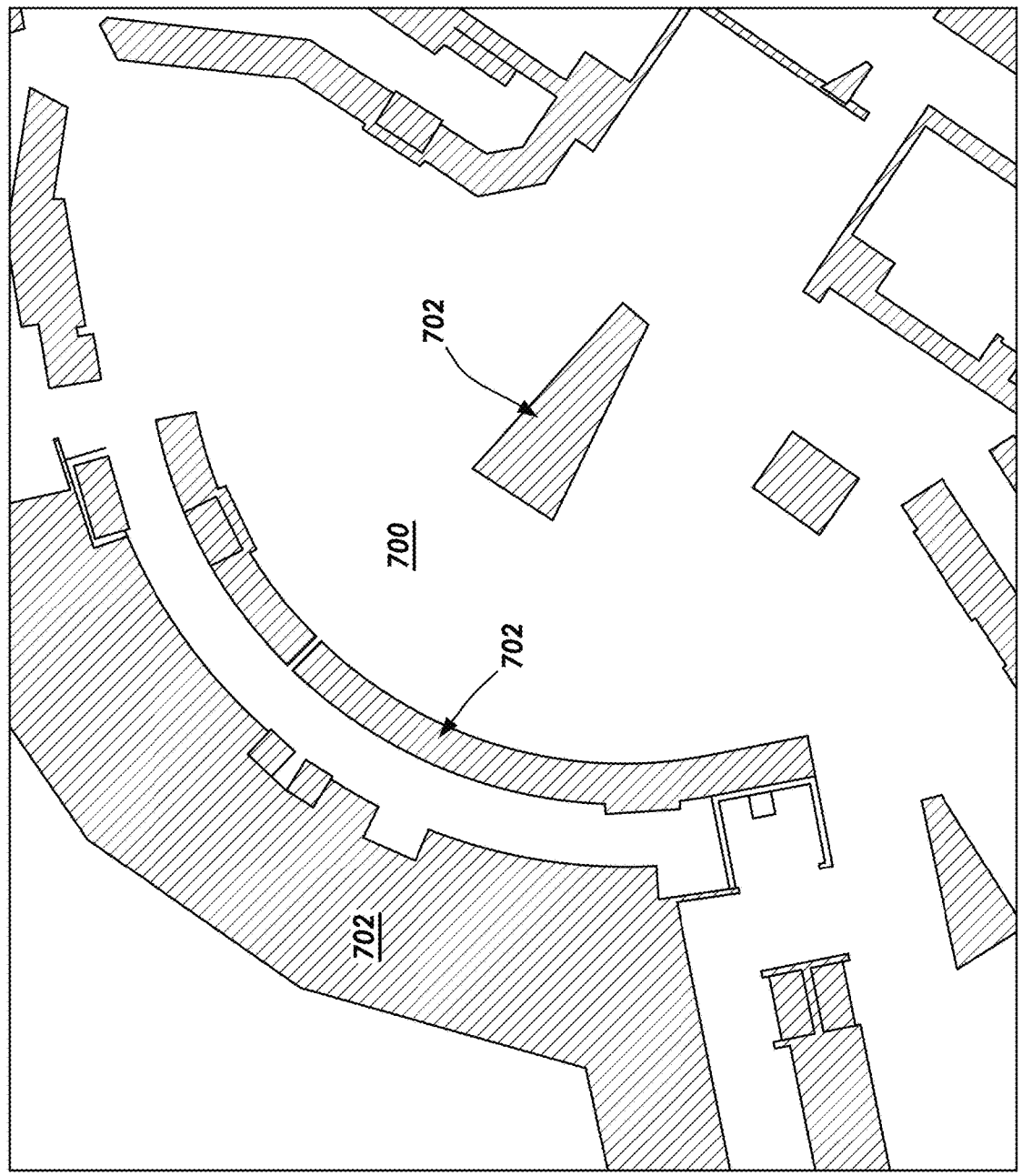
FIG. 18 shows an input floorplan for use in creating the raw path graph, in accordance with at least some embodiments.

FIG. 18 shows a visual example of a digitized floorplan for use in creating the raw path graph. In particular, FIG. 18 shows walkable areas 700 and non-walkable areas 702. The resultant of creating the Voronoi Diagram is the raw path graph, and the resultant is shown in FIG. 8. Turning again to FIG. 8, in some examples the raw path graph directly defines the local-walkable paths 800. In other cases, some further post-processing may take place, such as removal of unreachable portions of the raw path graph (e.g., portions 810 and 812). Moreover, there may be some further simplifications, such as combining largely collinear segments, such as segments 814. Nevertheless, the majority of the raw path graph segments form the local-walkable paths 800 for the floorplan (local-walkable paths 1408 of FIG. 14).

——————Post-Processing for Global-Walkable Paths

Returning to FIG. 14, the next step in the example method is creation of the global-walkable paths from the raw path graphs or from the local-walkable paths. Creating the global-walkable paths may comprise reducing the number of dead-end segments, and reducing the number of vertices. More specifically, creating the global-walkable paths may comprise trimming and merging of segments (block 1410, in the figure "trim leaves [and] merge closer branches"), close vertices simplification (block 1412), and path straitening (block 1414, in the figure "simply collinear edges"), with the resultant being the global-walkable paths (block 1416). Each is addressed in turn.

——————Trimming and Merging

In various examples, starting from the raw path graph or the local-walkable paths, dead-end segments are removed. Dead-end segments refer to segments that, on one end, do not share a vertex with another segment. Stated otherwise, of the two directions one could travel along a segment, a dead end segment has a direction of travel that does not form a path with another contiguous segment. Some dead-end segments end, terminate, or intersect a non-walkable area, and such dead-end segments are removed. Removal of dead-end segments may create more dead-end segments, and in some cases the trimming continues by removing dead-end segments having length shorter than a predetermined length. The predetermined length associated with trimming may be a meter or more, in some cases three meters, and in particular cases five meters. In some cases, the trimming based on the predetermined length may be recursive. That is, the example method may trim dead end paths based on the predetermined length, and then trim again multiple times based on the predetermined length. In some cases, the recursive trimming may end after a predetermined number of trimming cycles (e.g., two, four). In other cases, the predetermined length associated with each trimming cycle may get shorter (e.g., 5 meters, then three meters, then two meters), with each cycle ending when no further segments are present that meet the criterion.

Figure 19:
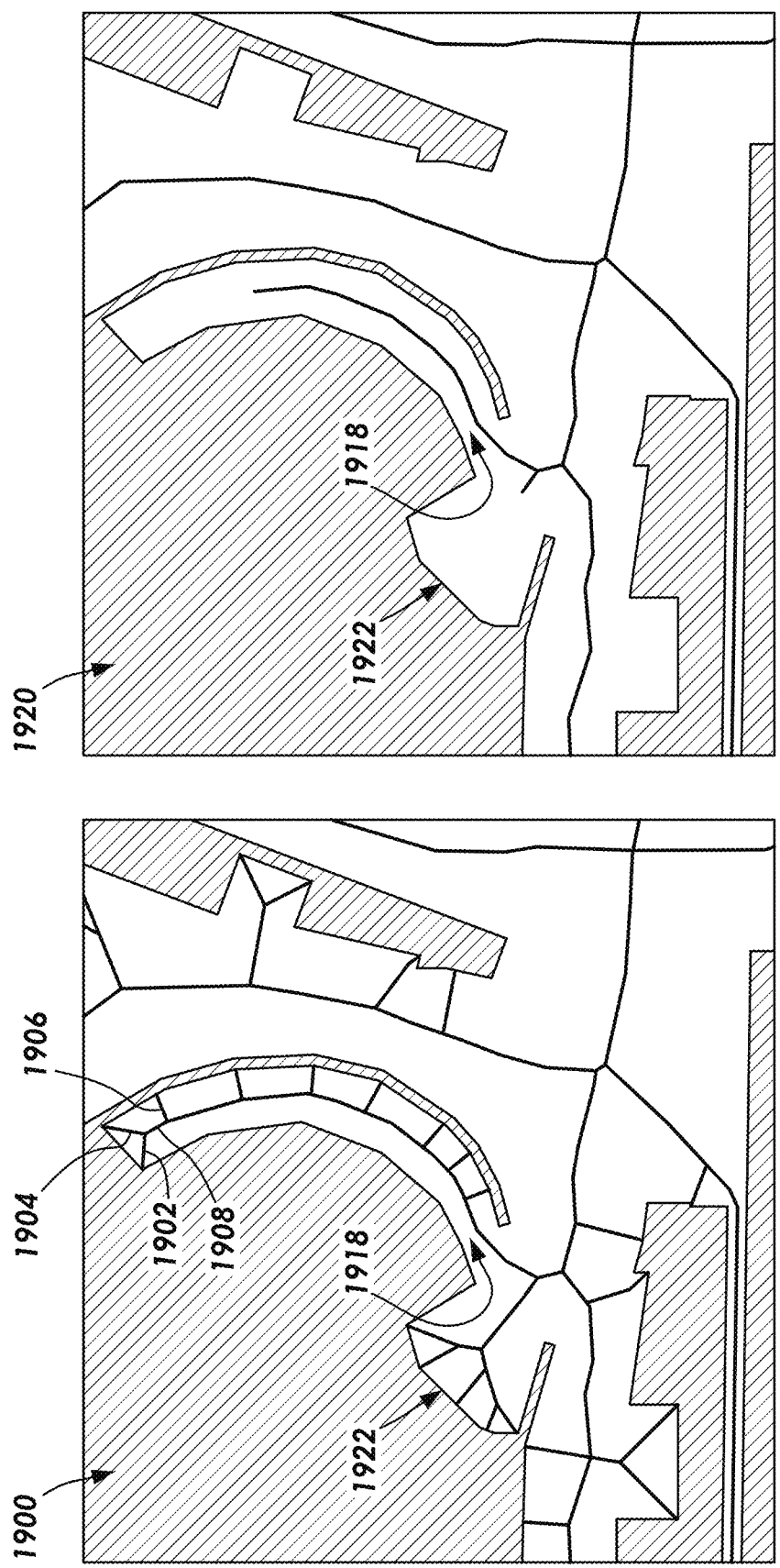
FIG. 19 shows example floorplans to describe trimming of segments, in accordance with at least some embodiments.

FIG. 19 shows example floorplans to describe trimming of segments. In particular, floorplan portion 1900 on the left shows a floorplan including local-walkable paths, such as segments 1902, 1904, 1906, and 1908. Segments 1902, 1904, and 1906 are dead-end segments that intersect a non-walkable area. In the example trimming, segments 1902, 1904, and 1906 are removed as intersecting a non-walkable area, as are many other segments along the example hallway 1918 and throughout the floorplan portion 1900. Thereafter, the example method removes dead-end segments with lengths shorter than the predetermined length. After removal of segments 1902, 1904, and 1906, segment 1908 is a dead-end segment. Thus, segment 1908 is removed as a dead-end segment shorter than the predetermined length. When either a predetermined number of cycles are complete, or no further segments remain that meet the predetermined length(s), the trimming ends.

Floorplan portion 1920 on the right shows an example of the digitized floorplan and segments after the trimming is complete. Notice how trimming the segments along the hallway 1918 leave only segments along the middle of the hallway 1918. Similarly, in the peninsula 1922, all the dead-end segments that intersect the non-walkable area have been removed, and several additional segments back toward the open area on the lower right have also been removed. The resultant of the trimming may represent an intermediate result in the creation of the global-walkable paths. The next step in the example method is merging of close paths.

In various examples, starting with the resultant of the trimming, the next step in the example method of generating the global-walkable paths is merging branches. In particular, segments that share a vertex and form an acute angle equal to or smaller than a predetermined angle are merged to create a merged segment, and the original segments are removed. In some examples, the predetermined angle is 45 angular degrees, but greater and smaller angles may be used. The length of the merged segment may take many forms. In some cases, the length of the merged segment may be an average of the lengths of the original branches. In other cases, the length of the merged segment may be the shorter of the lengths original branches. In yet still other cases, the length of the merged segment may be the longer of the lengths of the branches segments.

In some cases, the merging may then be repeated for the remaining branches, including branches formed by recently merged segments. In other cases, the repeated merging may continue until no further branches meet the predetermined angle. In yet still other cases, the further merging may take place a predetermined number of iterations (e.g., two, three, five).

Figure 20:
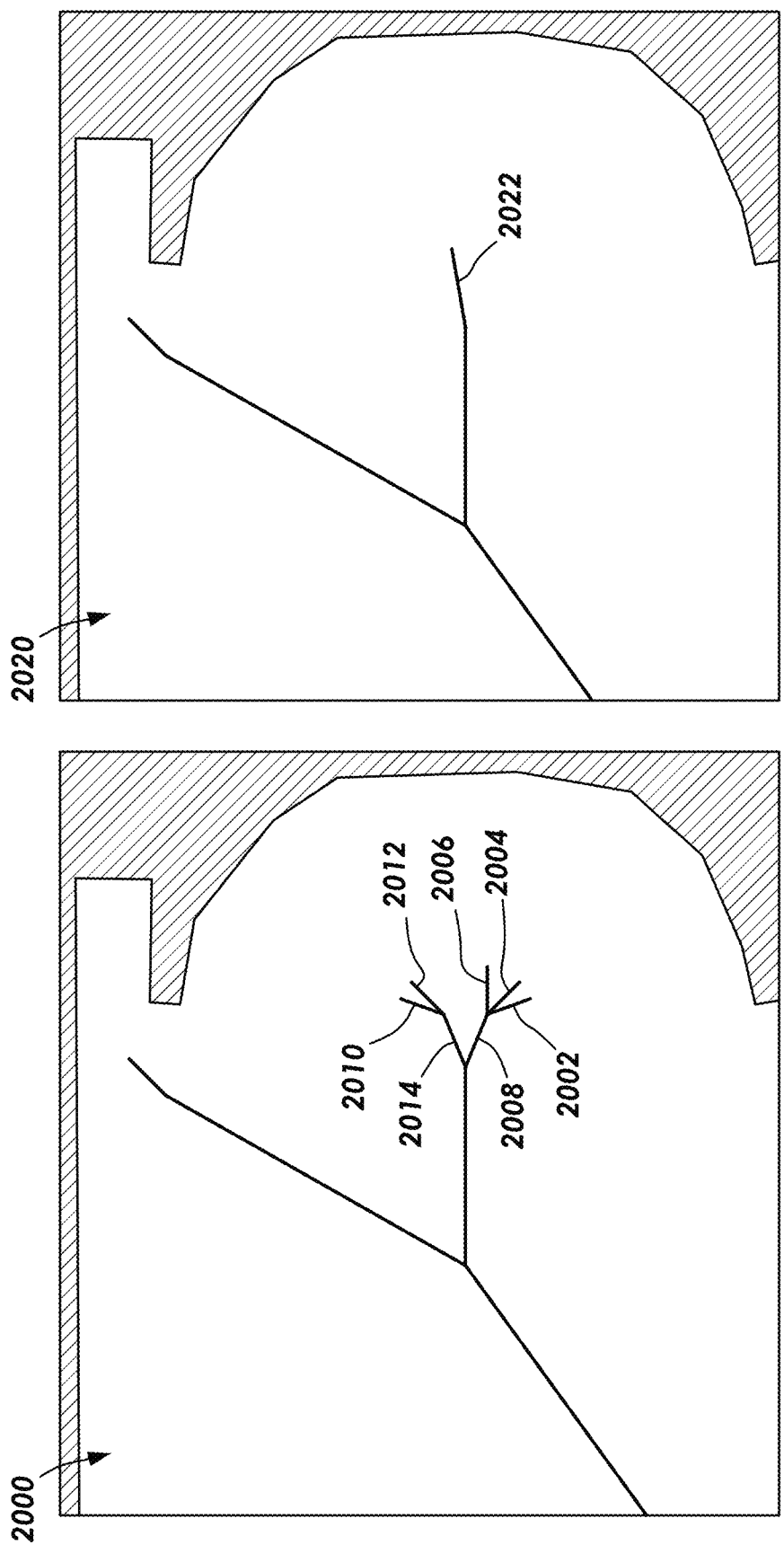
FIG. 20 shows example floorplans to describe merging of segments, in accordance with at least some embodiments.

FIG. 20 shows example floorplans to describe merging of branches. In particular, floorplan portion 2000 on the left shows an example set of segments after the trimming discussed above. The example segments comprise segments 2002, 2004, 2006, 2008, 2010, 2012, and 2014 (and others not specifically numbered). Segments 2002, 2004, and 2006 may be considered to form branches. Segments 2010 and 2012 may be considered to form branches. Likewise, segments 2008 and 2014 (and their connected segments) may be considered to form branches. In example cases, the server 114 is designed and programed to recursively merge the branches. For example, the server 114 may initially merge branches formed by segments 2002 and 2004 as these segments define an acute angle smaller than the predetermined angle, with resultant being a first merged segment, though the first merged segment is not specifically shown so as not to unduly complicate the figure. The first merged segment may form an acute angle smaller than the predetermined angle with the segment 2006, and thus the two segments/branches are merged to form a second merged segment, again not specifically shown. Similar merging may take place between the branches formed by segments 2010 and 2012, thus forming a third merged segment. Moving the further inward along the segments, consider that segment 2008 forms an acute angle less than the predetermined angle with segment 2014, the server 114 merges the segment 2008 (and in this example the second merged segment) with the segment 2014 (and in this example the third merged segment). The floorplan portion 2020 on the right shows the resultant merged segment 2022.

—————————————Close Vertices Simplification

Returning to FIG. 14, the next step in the example generation of the global-walkable paths is simplifying close vertices or close vertices reduction (block 1412). In particular, close vertices reduction (block 1412) may be considered to be reducing the number of vertices by, for contiguous segments that have a shared vertex and have a combined length less than or equal to a predetermined length, replacing the contiguous segments with a single segment that omits the shared vertex. In the case of close vertices simplification, the predetermined length is relatively short but non-zero, in some cases two meters or less, and in other cases a meter or less.

Figure 21:
FIG. 21 shows example floorplans to describe close vertices simplification, in accordance with at least some embodiments.

FIG. 21 shows example floorplans to describe close vertices simplification. In particular, floorplan portion 2100 on the left shows an example set of segments after the trimming and merging discussed above. Consider, as an example, the segments 2102 defining a path within hallway 2104. As shown, there are many, closely spaced segments remaining within the hallway 2104. In various examples, the paths defined by the segments are simplified by replacing contiguous segments having a combined length equal to or less than the predetermined length with a single segment that omits the shared vertex. The beginning point for the simplification may begin at any suitable point, such as the terminal end 2106 and working along the path. However, the beginning point may begin anywhere in the segments, working either direction. In some cases, a single pass analyzing all the segments may be sufficient, but in other cases, multiple passes through the segments, possibly with varying predetermined lengths for each pass, may be used.

Floorplan portion 2110 on the right shows an example resultant of the close vertices simplification. Referring specifically to the hallway 2104 as an example, notice how the number of segments defining the path within the hallway is significantly reduced.

—————————————Path Straightening

Returning to FIG. 14, the next step in the example method is simplifying collinear edges (block 1414), sometimes referred to as path straightening. In particular, in reducing the number of vertices as part of generating the global-walkable paths, the next example step may be, for contiguous segments that have a shared vertex and that form an obtuse angle within a predetermined range of angles, replacing the contiguous segments with a single segment that omits the shared vertex. In the context of path straightening, the predetermined range of angles may be between and including 135 angular degrees and 225 angular degrees.

Figure 22:
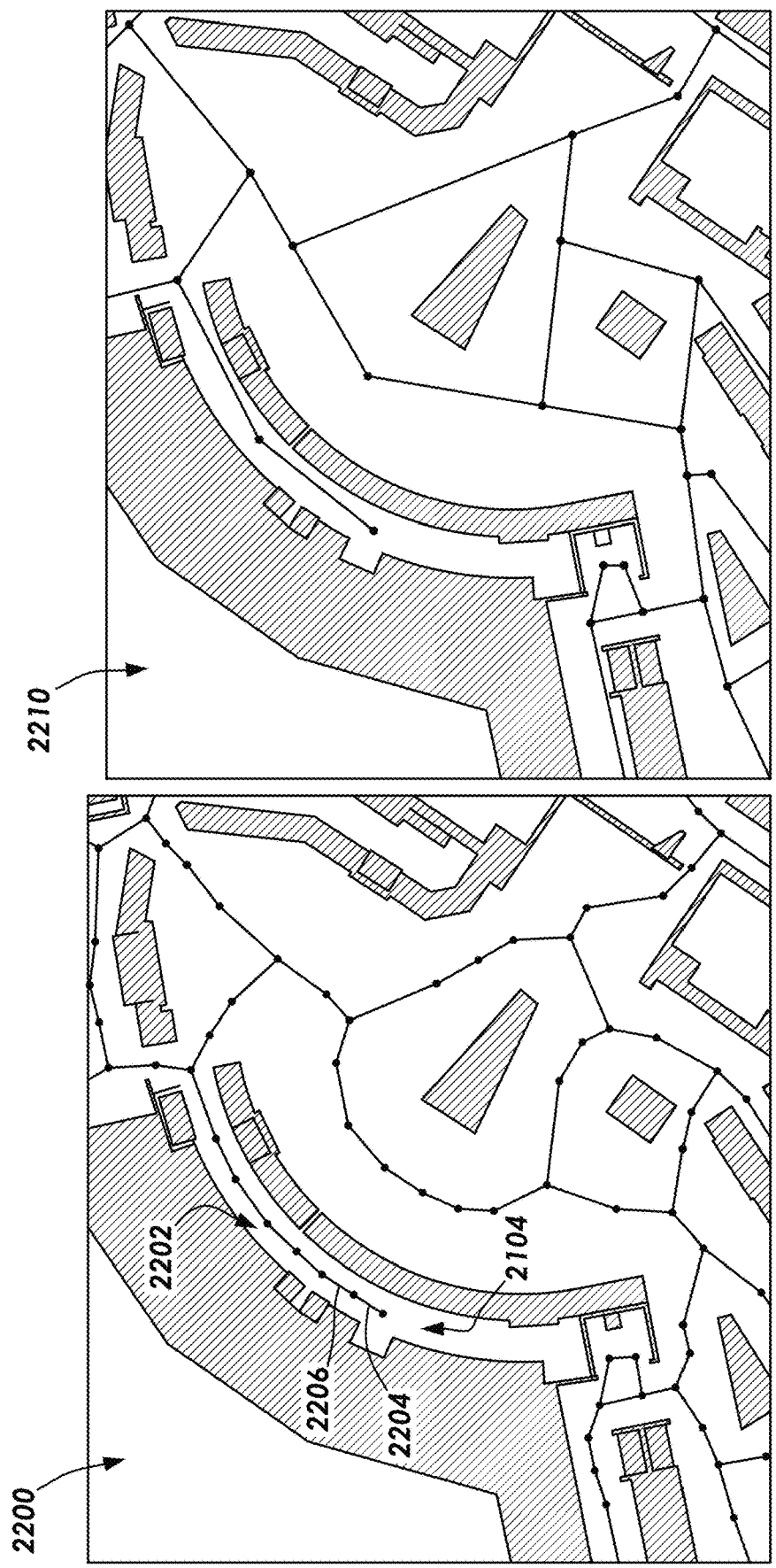
FIG. 22 shows example floorplans to describe path straightening, in accordance with at least some embodiments.

FIG. 22 shows example floorplans to describe path straightening. In particular, the floorplan portion 2200 on the left shows an example set of segments after the close vertices reduction discussed above. The floorplan portion 2200 is the effectively the same as floorplan portion 2110 of FIG. 21. Consider again, as an example, the segments 2202 defining a path within hallway 2104. As shown, there are several segments along the hallway 2104 that are relatively straight (e.g., have obtuse angles between and including 135 and 225 angular degrees). In accordance with various examples, for contiguous segments that have a shared vertex and that form an obtuse angle within a predetermined range of angles, the segments are replaced with a single segment that omits a shared vertex. For example, segment 2204 and segment 2206 may be replaced with a single segment, the replacement segment not specifically shown. The path straightening may continue along all the paths defined by the segments. Moreover, the path straightening may be repeated for multiple iterations. It is noted that if, for segments sharing a vertex, the replacement segment intersects a non-walkable area, the replacement is not made.

Floorplan portion 2210 on the right shows an example resultant of the path straightening. Referring specifically to the hallway 2104 as an example, notice how the number of segments defining the path within the hallway is significantly reduced. The floorplan portion 2210 may thus represent the global-walkable paths used for the route planning.

Example Computer Environment

Figure 23:
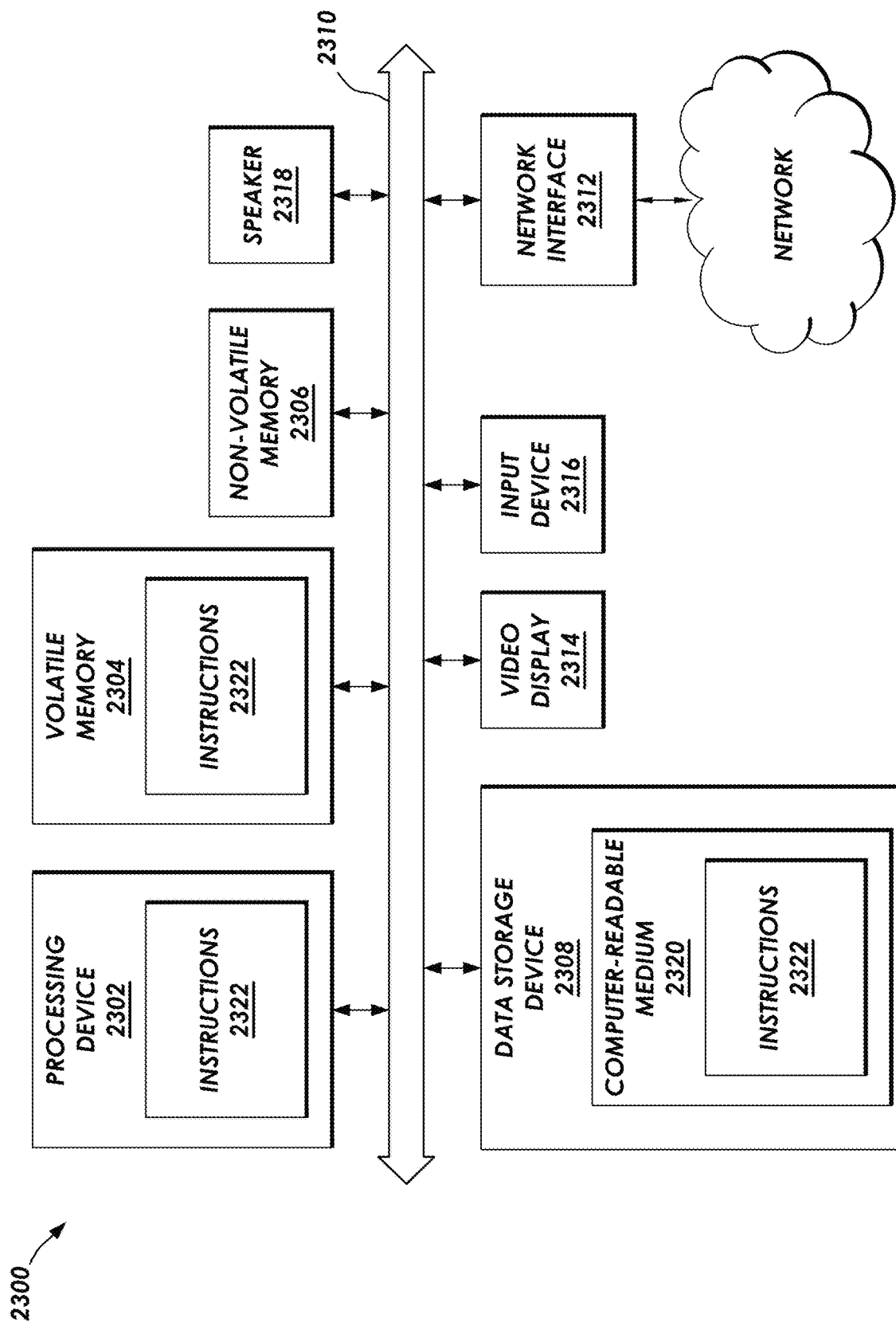
FIG. 23 shows an example computer system which can perform any one or more of the methods described herein.

FIG. 23 shows an example computer system 2300 that can perform any one or more of the methods described herein. The computer system may be connected (e.g., networked) to other computer systems in a LAN, an intranet, an extranet, or the Internet. The computer system may operate in the capacity of the server 114 in a client-server network environment. The computer system may be the mobile device 100, a mobile computer, personal computer (PC), a tablet computer, a set-top box (STB), a personal Digital Assistant (PDA), or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The computer system 2300 includes a processing device 2302, a volatile memory 2304 (e.g., random access memory (RAM)), a non-volatile memory 2306 (e.g., read-only memory (ROM), flash memory, solid state drives (SSDs), and a data storage device 2308, the foregoing of which are enabled to communicate with each other via a bus 2310.

Processing device 2302 represents one or more general-purpose processing devices such as a microprocessor, central processing unit, or the like. More particularly, the processing device 2302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 2302 may also be one or more special-purpose processing devices such as an application specific integrated circuit (ASIC), a system on a chip, a field programmable gate array (FPGA), a digital signal processor (DSP), network processor, or the like. The processing device 2302 may include more than one processing device, and each of the processing devices may be the same or different types. The processing device 2302 is configured to execute instructions for performing any of the operations and steps discussed herein.

The computer system 2300 may further include a communications interface or network interface device 2312. The network interface device 2312 may be configured to communicate data (e.g., path maps) via any suitable communication protocol. In some embodiments, the network interface devices 2312 may enable wireless (e.g., WiFi, Bluetooth, ZigBee, etc.) or wired (e.g., Ethernet, etc.) communications. The computer system 2300 also may include a video display 2314 (e.g., a liquid crystal display (LCD), a light-emitting diode (LED), an organic light-emitting diode (OLED), a quantum LED, a cathode ray tube (CRT), a shadow mask CRT, an aperture grille CRT, or a monochrome CRT), one or more input devices 2316 (e.g., a keyboard or a mouse), and one or more speakers 2318 (e.g., a speaker). In one illustrative example, the video display 2314 and the input device(s) 2316 may be combined into a single component or device (e.g., an LCD touch screen).

The network interface 2312 may transmit and receive data from a computer system application programming interface (API). The data may pertain to any suitable information described herein, such as applet requests, and path maps, among other information.

The data storage device 2308 may include a computer-readable storage medium 2320 on which the instructions 2322 embodying any one or more of the methods, operations, or functions described herein is stored. The instructions 2322 may also reside, completely or at least partially, within the volatile memory 2304 or within the processing device 2302 during execution thereof by the computer system 2300. As such, the volatile memory 2304 and the processing device 2302 also constitute computer-readable media. The instructions 2322 may further be transmitted or received over a network via the network interface device 2312.

While the computer-readable storage medium 2320 is shown in the illustrative examples to be a single medium, the term "computer-readable storage medium" should be taken to include a single medium or multiple media (e.g., a centralized or distributed database, or associated caches and servers) that store the one or more sets of instructions. The term "computer-readable storage medium" shall also be taken to include any medium capable of storing, encoding, or carrying a set of instructions for execution by the machine, where such set of instructions cause the machine to perform any one or more of the methodologies of the present disclosure. The term "computer-readable storage medium" shall accordingly be taken to include, but not be limited to, solid-state memories, optical media, and magnetic media.

The following clauses define various examples:

Clause 1. A method of providing route guidance by way of a mobile device, the method comprising: acquiring an applet by the mobile device, the acquiring responsive to a trigger event, and the trigger event identifies a destination location; determining, by the applet executed on the mobile device, an initial location of the mobile device; sending, by the applet executed on the mobile device, to a server an indication of the initial location of the mobile device and an indication of the destination location; receiving, by the mobile device from the server, a map comprising the initial location and the destination location; determining, by the applet executed on the mobile device, a route from the initial location to the destination location; and providing, by the applet executed on mobile device, guidance along the route to the destination location.

Clause 2. The method of claim 1 wherein a time duration between the trigger event and completion of the determining the route is four seconds or less.

Clause 3. The method of claim 1 wherein a time duration between the trigger event and completion of the determining is three seconds or less.

Clause 4. The method of any of clauses 1-3 wherein the applet has a size of 15 megabytes or less.

Clause 5. The method of any of clauses 1-4: wherein the trigger event comprises reading, by the mobile device, a bar code that encodes an identity of an online store, an identity of the applet, and an indication of the destination location; and wherein downloading the applet further comprises: downloading the applet from the online store; and instantiating the applet by the mobile device, the instantiating with the indication of the destination location.

Clause 6. The method of clause 5 wherein reading the bar code further comprises reading a two-dimensional bar code or reading a quick-response code.

Clause 7. The method of clause 5 wherein reading the bar code further comprises at least one selected from a group comprising: reading a quick-response code displayed statically; reading a quick-response code displayed statically on billboard; reading a quick-response code displayed on a boarding pass; reading a quick-response code displayed on a ticket; reading a quick-response code on printed media; and reading a quick-response code digitally rendered on a display device.

Clause 8. The method of any of clauses 1-4: wherein the trigger event comprises reading, by the mobile device, data using a short-range wireless communication protocol, the data encodes an identity of the applet and an indication of the destination location; and wherein acquiring the applet further comprises: downloading the applet from an online store; and instantiating the applet by the mobile device, the instantiating with the indication of the destination location.

Clause 9. The method of clause 8 wherein reading data using the short-range wireless communication protocol further comprises reading over a distance of 10 centimeters or less.

Clause 10. The method of clause 8 wherein reading data using the short-range wireless communication protocol further comprises reading using near-field communication.

Clause 11. The method of any of clauses 1-4: wherein the trigger event comprises crossing, by the mobile device, a geo-fence boundary, wherein crossing the geo-fence boundary is an indication of the destination location distinct from the geo-fence boundary; and wherein acquiring the applet further comprises: downloading the applet from an online store; and instantiating the applet by the mobile device, the instantiating with the indication of the destination location.

Clause 12. The method of any of clauses 1-11: wherein sending the indication of the destination location further comprises sending the indication of the destination location that is non-static; and wherein receiving the map further comprises receiving the map comprising the destination location being a physical location.

Clause 13. The method of clause 12 further comprising resolving, by the server, the physical location from the destination location that is non-static.

Clause 14. The method of clause 12 wherein sending the indication of the destination location that is non-static further comprises sending a request for route guidance to at least one selected from a group comprising: a previously unassigned departure gate for an airplane; a departure gate for an airplane that has changed; a previously unassigned departure location for train; and a departure location for train that has changed.

Clause 15. The method of any of clauses 1-14: wherein sending the indication of the destination location further comprises sending the indication of the destination location that is non-static; wherein receiving the map further comprises receiving the map comprising a plurality of destination locations; and wherein determining a route further comprises selecting, by the applet executed on the mobile device, the destination location based on the plurality of destination locations.

Clause 16. The method of clause 15 wherein sending the indication of the destination location that is non-static further comprises sending a request for route guidance to at least one selected from a group comprising: a closest fire escape; and a closest non-blocked fire escape.

Clause 17. The method of any of clauses 1-16: wherein receiving the map further comprises receiving the map comprising a plurality of paths between the initial location and the destination location; and wherein determining the route further comprises selecting, by the applet executed on the mobile device, a route comprising some but less than all the plurality of paths.

Clause 18. The method of any of clauses 1-17: wherein receiving the map further comprises receiving indications of local-walkable paths and global-walkable paths; wherein selecting the route further comprises: selecting a local-walkable path within a first predetermined distance of the initial location; selecting a global-walkable path to reach at least a second predetermined distance from the destination location; and selecting a local-walkable path within the second predetermined distance to the destination location.

Clause 19. The method of clause 18 wherein receiving the map further comprises receiving a single map comprising the indications of local-walkable paths and global-walkable paths.

Clause 20. The method of clause 18 wherein receiving the map further comprises receiving a local-path map comprising local-walkable paths and receiving a global-path map comprising global-walkable paths.

Clause 21. The method of any of clauses 1-20 wherein determining a route from the initial location to the destination location further comprises: determining the initial location resides in a non-walkable area; and responsive to the determination identifying exits from the non-walkable area by checking along a plurality of radials from the initial location to determine exit candidates; and selecting an exit along a radial having a shortest distance from the initial location to a walkable area.

Clause 22. The method of any of clauses 1-21 wherein determining a route from the initial location to the destination location further comprises: determining the initial location resides in a non-walkable area; and responsive to the determination identifying exits from the non-walkable area by checking along a plurality of radials from the initial location to determine exit candidates; and wherein determining the route further comprises evaluating at least two exit candidates as part of the route, and selecting an exit based on the evaluation of the at least two exit candidates.

Clause 23. The method of any of clauses 1-22 wherein receiving the map further comprises receiving a text-based map.

Clause 24. The method of any of clauses 1-22 wherein receiving the map further comprises receiving a text-based map encoded with geographic information.

Clause 25. The method of any of clauses 1-22 wherein receiving the map further comprises receiving a map that identified both walkable and non-walkable areas.

Clause 26. The method of any of clauses 1-25 wherein sending the indication of the initial location and indication of destination location further comprises sending in an encrypted format.

Clause 27. A computer-implemented method of implementing route guidance, the method comprising: receiving, by a processor from a mobile device, an indication of an initial location and an indication of a destination location; generating, by the processor, a path map based on a comprehensive map, the path map comprising the initial location, the destination location, and a plurality of paths representing a plurality of routes between the initial location and the destination location; and sending, by the processor, the path map to the mobile device.

Clause 28. The computer-implemented method of clause 27 wherein the comprehensive map encompasses a first area, and the path map encompasses a second area smaller than the first area.

Clause 29. The computer-implemented method of any of clauses 27-28 wherein generating the path map further comprises generating the path map comprising local-walkable paths and global-walkable paths.

Clause 30. The computer-implemented method of any of clauses 27-28: wherein generating the path map further comprises generating a local-path map and a global-path map; and wherein sending the path map further comprises sending the local-path map and the global-path map.

Clause 31. The computer-implemented method of any of clauses 27-28 wherein generating the path map further comprises generating the path map delineating walkable areas and non-walkable areas, the paths residing within the walkable areas.

Clause 32. The computer-implemented method of any of clauses 27-31 further comprising, prior to generating the path map, determining a physical location based on the indication of the destination location, and assigning the physical location to be the destination location.

Clause 33. The computer-implemented method of clause 32 wherein determining the physical location further comprises accessing, by the processor, a third-party database resolving a relationship between the physical location and the indication of the destination location.

Clause 34. The computer-implemented method of clause 32 wherein determining the physical location based on the indication of the destination location further comprises determining at least one selected from a group comprising: a previously unassigned departure gate for an airplane; a departure gate for an airplane that has changed; a previously unassigned departure location for train; and a departure location for train that has changed.

Clause 35. The computer-implemented method of any of clauses 27-34 further comprising, prior to generating the path map, determining a plurality of physical locations based on the indication of the destination location, and assigning the destination location to comprise the plurality of physical locations.

Clause 36. The computer-implemented method of clause 35 wherein determining the plurality of physical locations further comprises selecting the plurality of physical locations from a set of destination locations based on a predetermined criteria.

Clause 37. The computer-implemented method of clause 35 wherein determining the plurality of physical locations based on the indication of the destination location further comprises determining at least one selected from a group comprising: a set comprising closest fire escapes; and a set comprising closest non-blocked fire escape.

Clause 38. The computer-implemented method of any of clauses 27-37 wherein the path map is text based.

Clause 39. The computer-implemented method of any of clauses 27-37 wherein the path map is text based and encoded with geographic information.

Clause 40. The computer-implemented method of any of clauses 27-39 wherein receiving further comprises: receiving the indication of the initial location and the indication of a destination location in an encrypted format; and decrypting the encrypted format.

Clause 41. A computer system comprising: a processor; a communications interface coupled to the processor; a memory coupled to the processor, the memory storing instructions that, when executed by the processor, cause the processor to: receive, from a mobile device, an indication of an initial location and an indication of a destination location; generate a path map based on a comprehensive map, the path map comprising the initial location, the destination location, and a plurality of paths representing a plurality of routes between the initial location and the destination location; and send the path map to the mobile device.

Clause 42. The computer system of clause 41 wherein the comprehensive map encompasses a first area, and the path map encompasses a second area smaller than the first area.

Clause 43. The computer system of any of clauses 41-42 wherein when the processor generates the path map, the instructions further cause the processor to generate the path map comprising local-walkable paths and global-walkable paths.

Clause 44. The computer system of any of clauses 41-42: wherein when the processor generates the path map, the instructions further cause the processor to generate a local-path map and a global-path map; and wherein when the processor sends the path map, the instructions further cause the processor to send the local-path map and the global-path map.

Clause 45. The computer system of any of clauses 41-42 wherein when the processor generates the path map, the instructions further cause the processor to generate the path map delineating walkable areas and non-walkable areas, the paths residing within the walkable areas.

Clause 46. The computer system of any of clauses 41-45 wherein the instructions further cause the processor to, prior to generating the path map, determine a physical location based on the indication of the destination location, and assign the physical location to be the destination location.

Clause 47. The computer system of clause 46 wherein when the processor determines the physical location, the instructions further cause the processor to access a third-party database to resolve a relationship between the physical location and the indication of the destination location.

Clause 48. The computer system of clause 46 wherein when the processor determines the physical location, the instructions further cause the processor to determine at least one selected from a group comprising: a previously unassigned departure gate for an airplane; a departure gate for an airplane that has changed; a previously unassigned departure location for train; and a departure location for train that has changed.

Clause 49. The computer system of any of clauses 41-48 wherein the instructions further cause the processor to, prior to generating the path map, determine a plurality of physical locations based on the indication of the destination location, and assigning the destination location to comprise the plurality of physical locations.

Clause 50. The computer system of clause 49 wherein when the processor determines the plurality of physical locations, the instructions further cause the processor to select the plurality of physical locations from a set of destination locations based on a predetermined criteria.

Clause 51. The computer system of clause 49 wherein when the processor determines the plurality of physical locations, the instructions further cause the processor to determine at least one selected from a group comprising: a set comprising closest fire escapes; and a set comprising closest non-blocked fire escape.

Clause 52. A computer-implemented method of generating comprehensive maps for route guidance, the method comprising: receiving, by a processor, a floor-plan delineating walkable and non-walkable areas; performing, by the processor, spatial analysis regarding the walkable areas to find a path graph for the walkable areas, the path graph comprises a plurality of segments defined by vertices, and the plurality of segments defining local-walkable paths; and generating, by the processor, a set of global-walkable paths from the path graph, the generating comprising reducing a number of dead-end segments, and reducing a number of vertices.

Clause 53. The computer-implemented method of clause 52 wherein reducing the number of dead-end segments further comprises removing segments that are dead-end segments that intersect non-walkable areas.

Clause 54. The computer-implemented method of clause 53 further comprising removing segments with lengths shorter than a predetermined length.

Clause 55. The computer-implemented method of clause 54 wherein removing segments further comprises removing segments recursively based on the predetermined length.

Clause 56. The computer-implemented method of clause 55 wherein the predetermined length is different for each recursive removing.

Clause 57. The computer-implemented method of clause 55 wherein predetermined length is shorter for each successive removing.

Clause 58. The computer-implemented method of clause 54 wherein removing recursively further comprises performing a predetermined number of the removings.

Clause 59. The computer-implemented method of any of clauses 52-58 wherein reducing the number of segments further comprises creating a merged segment based on a first branch and a second branch that share a vertex and form an acute angle equal to or smaller than a predetermined angle, and after the creating removing the first and second branches.

Clause 60. The computer-implemented method of clause 59 wherein the predetermined angle is 45 angular degrees.

Clause 61. The computer-implemented method of clause 59 further comprising repeating the creating of a merged segment for each set of branches that share a vertex and form an acute angles equal to or smaller than the predetermined angle.

Clause 62. The computer-implemented method of clause 59 wherein a length of the merged segment is at least one selected from a group comprising: an average of a length of the first branch and a length of the second branch; the shorter of the length of the first branch and the length of the second branch; and the longer of the length of the first branch and the length of the second branch.

Clause 63. The computer-implemented method of any of clauses 52-62 further comprising: identifying polygons defining non-walkable areas that overlap, the identifying results in overlapping polygons; and unioning the overlapping polygons to create a single polygon that covers an area encompassed by the overlapping polygons.

Clause 64. The computer-implemented method of any of clauses 52-63 further comprising removing polygons defining non-walkable areas smaller than a predetermined area.

Clause 65. The computer-implemented method of clause 64 wherein the predetermined area is venue dependent.

Clause 66. The computer-implemented method of clause 64 wherein the predetermined area is at least one selected from a group comprising: 10 centimeters squared for an office building; and 20 centimeters squared for a warehouse.

Clause 67. The computer-implemented method of any of clauses 52-66 further comprising expanding one or more polygons defining non-walkable areas to remove walkable areas having a smallest dimension equal to or smaller than a predetermined length.

Clause 68. The computer-implemented method of any of clauses 52-67 wherein reducing the number of vertices further comprises, for contiguous segments that have a shared vertex and have a combined length equal to or less than a predetermined length, replacing the contiguous segments with a single segment that omits the shared vertex.

Clause 69. The computer-implemented method of clause 68 wherein the predetermined length is one meter.

Clause 70. The computer-implemented method of any of clauses 52-69 wherein reducing the number of vertices further comprises, for contiguous segments that have a shared vertex and that form an obtuse angle within a predetermined range of angles, replacing the contiguous segments with a single segment that omits a shared vertex.

Clause 71. The computer-implemented method of clause 70 wherein the predetermined range of angles may be between and including 135 angular degrees and 225 angular degrees.

Clause 72. A computer system comprising: a processor; a communications interface coupled to the processor; a memory coupled to the processor, the memory storing instructions that, when executed by the processor, cause the processor to: receive a floorplan delineating walkable and non-walkable areas; perform spatial analysis regarding the walkable areas to find a path graph for the walkable areas, the path graph comprises a plurality of segments defined by vertices, and the plurality of segments defining local-walkable paths; and generate a set of global-walkable paths from the path graph, the generating comprising reducing a number of dead-end segments, and reducing a number of vertices.

Clause 73. The computer system of clause 72 wherein when the processor reduces the number of dead-end segments, the instructions further cause the processor to remove segments that are dead-end segments that intersect non-walkable areas.

Clause 74. The computer system of clause 73 wherein the instructions further cause the processor to remove segments with lengths shorter than a predetermined length.

Clause 75. The computer system of clause 74 wherein when the processor removes segments, the instructions further causes the processor to remove segments recursively based on the predetermined length.

Clause 76. The computer system of clause 75 wherein the predetermined length is different for each recursive removing.

Clause 77. The computer system of clause 75 wherein predetermined length is shorter for each successive removing.

Clause 78. The computer system of clause 74 wherein when the processor removes recursively, the instructions further cause the processor to perform a predetermined number of the removings.

Clause 79. The computer system of any of clauses 72-78 wherein when the processor reduces the number of dead-end segments, the instructions further cause the processor to create a merged segment based on a first branch and a second branch that share a vertex and form an acute angle equal to or smaller than a predetermined angle, and after the creation remove the first and second branches.

Clause 80. The computer system of clause 79 wherein the predetermined angle is 45 angular degrees.

Clause 81. The computer system of clause 79 wherein the instructions further cause the processor to repeat the creation of a merged segment for each set of branches that share a vertex and form an acute angles equal to or smaller than the predetermined angle.

Clause 82. The computer system of clause 79 wherein a length of the merged segment is at least one selected from a group comprising: an average of a length of the first branch and a length of the second branch; the shorter of the length of the first branch and the length of the second branch; and the longer of the length of the first branch and the length of the second branch.

Clause 83. The computer system of any of clauses 72-82 wherein the instructions further cause the processor to: identify polygons defining non-walkable areas that overlap, the identifying results in overlapping polygons; and union the overlapping polygons to create a single polygon that covers an area encompassed by the overlapping polygons.

Clause 84. The computer system of any of clauses 72-83 wherein the instructions further cause the processor to remove polygons defining non-walkable areas smaller than a predetermined area.

Clause 85. The computer system of clause 84 wherein the predetermined area is venue dependent.

Clause 86. The computer system of clause 84 wherein the predetermined area is at least one selected from a group comprising: 10 centimeters squared for an office building; and 20 centimeters squared for a warehouse.

Clause 87. The computer system of any of clauses 72-86 wherein the instructions further cause the processor to expand one or more polygons defining non-walkable areas to remove walkable areas having a smallest dimension equal to or smaller than a predetermined length.

Clause 88. The computer system of any of clauses 72-87 wherein when the processor reduces the number of vertices, the instructions further cause the processor to, for contiguous segments that have a shared vertex and have a combined length equal to or less than a predetermined length, replace the contiguous segments with a single segment that omits the shared vertex.

Clause 89. The computer system of clause 88 wherein the predetermined length is one meter.

Clause 90. The computer system of any of clauses 72-89 wherein when the processor reduces the number of vertices, the instructions further cause the processor to, for contiguous segments that have a shared vertex and that form an obtuse angle within a predetermined range of angles, replace the contiguous segments with a single segment that omits a shared vertex.

Clause 91. The computer system of clause 90 wherein the predetermined range of angles may be between and including 135 angular degrees and 225 angular degrees.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer-implemented method of generating maps for route guidance, the method comprising:
receiving, by a processor, a floorplan delineating walkable and non-walkable areas;
performing, by a processor, spatial analysis regarding the walkable areas to find a path graph for the walkable areas, the path graph comprises a plurality of segments defined by vertices, and the plurality of segments defining local-walkable paths; and
removing, by a processor, segments that intersect non-walkable areas to generate a set of global-walkable paths from the path graph.

2. The computer-implemented method of claim 1 further comprising removing segments with lengths shorter than a predetermined length.

3. The computer-implemented method of claim 2 wherein removing segments further comprises removing segments recursively based on the predetermined length.

4. The computer-implemented method of claim 3 wherein the predetermined length is different for each recursive removing.

5. The computer-implemented method of claim 3 wherein predetermined length is shorter for each successive removing.

6. The computer-implemented method of claim 2 wherein removing recursively further comprises performing a predetermined number of the removings.

7. The computer-implemented method of claim 1 further comprising creating a merged segment based on a first branch and a second branch that share a vertex and form an acute angle equal to or smaller than a predetermined angle, and after the creating removing the first and second branches.

8. The computer-implemented method of claim 7 wherein the predetermined angle is 45 angular degrees.

9. The computer-implemented method of claim 7 further comprising repeating the creating of a merged segment for each set of branches that share a vertex and form an acute angles equal to or smaller than the predetermined angle.

10. The computer-implemented method of claim 7 wherein a length of the merged segment is at least one selected from a group comprising: an average of a length of the first branch and a length of the second branch; the shorter of the length of the first branch and the length of the second branch; and the longer of the length of the first branch and the length of the second branch.

11. A computer system comprising:
a processor;
a communications interface coupled to the processor;
a memory coupled to the processor, the memory storing instructions that, when executed by the processor, cause the processor to:
receive a floorplan delineating walkable and non-walkable areas;
perform spatial analysis regarding the walkable areas to find a path graph for the walkable areas, the path graph comprises a plurality of segments defined by vertices, and the plurality of segments defining local-walkable paths; and
remove segments that intersect non-walkable areas to generate a set of global-walkable paths from the path graph.

12. The computer system of claim 11 wherein the instructions further cause the processor to remove segments with lengths shorter than a predetermined length.

13. The computer system of claim 12 wherein when the processor removes segments, the instructions further causes the processor to remove segments recursively based on the predetermined length.

14. The computer system of claim 13 wherein the predetermined length is different for each recursive removing.

15. The computer system of claim 13 wherein predetermined length is shorter for each successive removing.

16. The computer system of claim 12 wherein when the processor removes recursively, the instructions further cause the processor to perform a predetermined number of the removings.

17. The computer system of claim 11 wherein the instructions further cause the processor to create a merged segment based on a first branch and a second branch that share a vertex and form an acute angle equal to or smaller than a predetermined angle, and after the creation remove the first and second branches.

18. The computer system of claim 17 wherein the predetermined angle is 45 angular degrees.

19. The computer system of claim 17 wherein the instructions further cause the processor to repeat the creation of a merged segment for each set of branches that share a vertex and form an acute angles equal to or smaller than the predetermined angle.

20. The computer system of claim 17 wherein a length of the merged segment is at least one selected from a group comprising: an average of a length of the first branch and a length of the second branch; the shorter of the length of the first branch and the length of the second branch; and the longer of the length of the first branch and the length of the second branch.

* * * * *

UNITED STATES PATENT AND TRADEMARK OFFICE
CERTIFICATE OF CORRECTION

PATENT NO. : 12,228,418 B1
APPLICATION NO. : 18/937361
DATED : February 18, 2025
INVENTOR(S) : Haluk Ziya Zorluoglu et al.

Page 1 of 1

It is certified that error appears in the above-identified patent and that said Letters Patent is hereby corrected as shown below:

In the Claims

Column 36, Line 35, Claim 9, Line 4. Please change "angles equal" to -- angle equal --.

Column 37, Line 18, Claim 19, Line 4. Please change "angles equal" to -- angle equal --.

Signed and Sealed this
Tenth Day of June, 2025

Coke Morgan Stewart
*Acting Director of the United States Patent and Trademark Office*